US008145026B2

(12) United States Patent  
Overton et al.

(10) Patent No.: US 8,145,026 B2  
(45) Date of Patent: *Mar. 27, 2012

(54) REDUCED-SIZE FLAT DROP CABLE

(75) Inventors: Bob J. Overton, Lenoir, NC (US); Jeffrey Scott Barker, Statesville, NC (US)

(73) Assignee: Draka Comteq, B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/615,003

(22) Filed: Nov. 9, 2009

(65) Prior Publication Data

US 2010/0135624 A1    Jun. 3, 2010

Related U.S. Application Data

(63) Continuation-in-part of application No. 12/267,732, filed on Nov. 10, 2008, application No. 12/615,003.

(60) Provisional application No. 60/986,737, filed on Nov. 9, 2007, provisional application No. 61/041,484, filed on Apr. 1, 2008, provisional application No. 61/112,595, filed on Nov. 7, 2008, provisional application No. 61/112,912, filed on Nov. 10, 2008, provisional application No. 61/177,996, filed on May 13, 2009, provisional application No. 61/248,319, filed on Oct. 2, 2009.

(51) Int. Cl.  
*G02B 6/02* (2006.01)

(52) U.S. Cl. ......... 385/128; 385/103; 385/100; 385/102

(58) Field of Classification Search .................. 385/100, 385/102, 114, 128  
See application file for complete search history.

(56) References Cited

U.S. PATENT DOCUMENTS

| | | |
|---|---|---|
| RE30,635 E | 6/1981 | Kuppers et al. |
| 4,718,748 A | 1/1988 | Broer et al. |
| 4,838,643 A | 6/1989 | Hodges et al. |
| 4,848,869 A | 7/1989 | Urruti |
| 4,852,968 A | 8/1989 | Reed |
| 4,904,051 A | 2/1990 | Broer et al. |
| 5,044,724 A | 9/1991 | Glodis et al. |
| 5,062,685 A | 11/1991 | Cain et al. |
| 5,146,531 A | 9/1992 | Shustack |
| 5,574,816 A | 11/1996 | Yang et al. |

(Continued)

FOREIGN PATENT DOCUMENTS

EP    1116972 A1    7/2001

(Continued)

OTHER PUBLICATIONS

U.S. Appl. No. 60/986,737, filed Nov. 9, 2007.

(Continued)

*Primary Examiner* — Ellen Kim  
(74) *Attorney, Agent, or Firm* — Summa, Additon & Ashe, P.A.

(57) ABSTRACT

Disclosed is an improved optical fiber that employs a novel coating system. When combined with a bend-insensitive glass fiber, the novel coating system according to the present invention yields an optical fiber having exceptionally low losses.

The coating system features (i) a softer primary coating with excellent low-temperature characteristics to protect against microbending in any environment and in the toughest physical situations and, optionally, (ii) a colored secondary coating possessing enhanced color strength and vividness.

The improved coating system provides optical fibers that are useful in reduced-size drop cables.

35 Claims, 13 Drawing Sheets

U.S. PATENT DOCUMENTS

| | | |
|---|---|---|
| 5,717,805 A | 2/1998 | Stulpin |
| 5,761,362 A | 6/1998 | Yang et al. |
| 5,911,023 A | 6/1999 | Risch et al. |
| 5,982,968 A | 11/1999 | Stulpin |
| 6,035,087 A | 3/2000 | Bonicel et al. |
| 6,041,153 A | 3/2000 | Yang |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,210,802 B1 | 4/2001 | Risch et al. |
| 6,215,931 B1 | 4/2001 | Risch et al. |
| 6,240,224 B1 | 5/2001 | Reekie et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,411,403 B1 | 6/2002 | Siddhamalli |
| 6,493,491 B1 | 12/2002 | Shen et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,694,079 B1 | 2/2004 | Matsuo et al. |
| 6,749,446 B2 | 6/2004 | Nechitailo |
| 6,901,197 B2 | 5/2005 | Hasegawa et al. |
| 6,912,347 B2 | 6/2005 | Rossi et al. |
| 6,922,515 B2 | 7/2005 | Nechitailo et al. |
| 6,941,049 B2 | 9/2005 | Risch et al. |
| 6,961,508 B2 * | 11/2005 | van Eekelen et al. .......... 385/144 |
| 7,045,010 B2 | 5/2006 | Sturman, Jr. |
| 7,085,466 B2 * | 8/2006 | Roba et al. ................... 385/128 |
| 7,095,940 B2 | 8/2006 | Hayami et al. |
| 7,162,128 B2 | 1/2007 | Lovie et al. |
| 7,171,103 B2 * | 1/2007 | Eekelen et al. ............... 385/144 |
| 7,200,310 B2 | 4/2007 | Roba et al. |
| 7,228,040 B2 | 6/2007 | Nakajima et al. |
| 7,239,784 B2 | 7/2007 | Hayami et al. |
| 7,272,289 B2 | 9/2007 | Bickham et al. |
| 7,292,762 B2 | 11/2007 | Guan et al. |
| 7,317,858 B2 | 1/2008 | Roba et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,433,566 B2 | 10/2008 | Bookbinder et al. |
| 7,444,838 B2 | 11/2008 | Pickrell et al. |
| 7,450,806 B2 | 11/2008 | Bookbinder et al. |
| 7,450,807 B2 | 11/2008 | Bickham et al. |
| 7,483,613 B2 | 1/2009 | Bigot-Astruc et al. |
| 7,515,795 B2 | 4/2009 | Overton et al. |
| 7,526,166 B2 | 4/2009 | Bookbinder et al. |
| 7,526,169 B2 | 4/2009 | Bickham et al. |
| 7,555,186 B2 | 6/2009 | Flammer et al. |
| 7,555,187 B2 | 6/2009 | Bickham et al. |
| 7,567,739 B2 | 7/2009 | Overton et al. |
| 7,567,742 B2 | 7/2009 | Pickrell et al. |
| 7,569,801 B2 | 8/2009 | Oka |
| 7,570,852 B2 | 8/2009 | Nothofer et al. |
| 7,574,088 B2 | 8/2009 | Sugizaki et al. |
| 7,574,095 B2 | 8/2009 | Lock et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,954 B2 | 1/2010 | Tatat |
| 7,665,902 B2 | 2/2010 | Griffioen et al. |
| 7,873,249 B2 * | 1/2011 | Kachmar et al. ............ 385/102 |
| 2002/0034367 A1 * | 3/2002 | Gaillard et al. ............. 385/113 |
| 2004/0013382 A1 | 1/2004 | van Eekelen et al. |
| 2004/0022511 A1 | 2/2004 | Eekelen et al. |
| 2004/0208463 A1 * | 10/2004 | Park ............................. 385/114 |
| 2005/0089289 A1 | 4/2005 | Hayami et al. |
| 2006/0024010 A1 * | 2/2006 | van Eekelen et al. ........ 385/128 |
| 2007/0019915 A1 | 1/2007 | Overton et al. |
| 2007/0077016 A1 * | 4/2007 | Bickham et al. ............. 385/128 |
| 2007/0127878 A1 | 6/2007 | de Montmorillon et al. |
| 2007/0183726 A1 | 8/2007 | Nothofer et al. |
| 2007/0263960 A1 | 11/2007 | Lock et al. |
| 2007/0280615 A1 | 12/2007 | de Montmorillon et al. |
| 2008/0013898 A1 * | 1/2008 | Wells .............................. 385/96 |
| 2008/0037942 A1 | 2/2008 | Tatat |
| 2008/0056654 A1 | 3/2008 | Bickham et al. |
| 2008/0145010 A1 | 6/2008 | Overton et al. |
| 2008/0152288 A1 | 6/2008 | Flammer et al. |
| 2008/0166094 A1 | 7/2008 | Bookbinder et al. |
| 2008/0181564 A1 | 7/2008 | Overton et al. |
| 2008/0193092 A1 * | 8/2008 | Greenwood et al. .......... 385/113 |
| 2008/0279514 A1 * | 11/2008 | Kundis et al. .................. 385/113 |
| 2008/0292262 A1 | 11/2008 | Overton et al. |
| 2008/0304800 A1 | 12/2008 | Bickham et al. |
| 2008/0317410 A1 | 12/2008 | Griffioen et al. |
| 2009/0003779 A1 | 1/2009 | Parris |
| 2009/0003781 A1 | 1/2009 | Parris et al. |
| 2009/0003785 A1 | 1/2009 | Parris et al. |
| 2009/0041414 A1 | 2/2009 | Lavenne et al. |
| 2009/0060437 A1 | 3/2009 | Fini et al. |
| 2009/0126407 A1 | 5/2009 | Bookbinder et al. |
| 2009/0154888 A1 | 6/2009 | Abbott, III et al. |
| 2009/0169163 A1 | 7/2009 | Abbott, III et al. |
| 2009/0175583 A1 | 7/2009 | Overton |
| 2009/0214167 A1 | 8/2009 | Lookadoo et al. |
| 2009/0232461 A1 * | 9/2009 | Nakajima et al. ............. 385/114 |
| 2009/0252469 A1 | 10/2009 | Sillard et al. |
| 2009/0274424 A1 | 11/2009 | Debut et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2009/0317039 A1 * | 12/2009 | Blazer et al. ................... 385/107 |
| 2010/0021170 A1 | 1/2010 | Lumineau et al. |
| 2010/0028020 A1 | 2/2010 | Gholami et al. |
| 2010/0067855 A1 | 3/2010 | Barker |
| 2010/0067857 A1 | 3/2010 | Lovie et al. |
| 2010/0067859 A1 | 3/2010 | de Montmorillon et al. |
| 2010/0092135 A1 | 4/2010 | Barker et al. |
| 2010/0092138 A1 | 4/2010 | Overton |
| 2010/0092139 A1 | 4/2010 | Overton |
| 2010/0092140 A1 | 4/2010 | Overton |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0166375 A1 | 7/2010 | Parris |
| 2010/0183821 A1 | 7/2010 | Hartsuiker et al. |
| 2010/0189400 A1 * | 7/2010 | Sillard et al. .................. 385/127 |
| 2010/0209059 A1 * | 8/2010 | Conrad et al. ................. 385/110 |
| 2010/0254668 A1 * | 10/2010 | Consonni et al. ............. 385/102 |

FOREIGN PATENT DOCUMENTS

| | | | |
|---|---|---|---|
| EP | 1650174 A2 | 4/2006 | |
| EP | 1785754 A1 | 5/2007 | |
| EP | 1845399 A1 | 10/2007 | |
| EP | 1921478 A1 | 5/2008 | |
| EP | 1930753 A1 | 6/2008 | |
| WO | 01/05724 A2 | 1/2001 | |
| WO | 02/055614 A2 | 7/2002 | |
| WO | 03/091177 A1 | 11/2003 | |
| WO | 03/091178 A | 11/2003 | |
| WO | 03/091781 A1 | 11/2003 | |
| WO | 2007/013923 A2 | 2/2007 | |
| WO | 2008/037291 A1 | 4/2008 | |
| WO | 2008/157341 A2 | 12/2008 | |
| WO | 2009/062131 A1 | 5/2009 | |
| WO | 2009/064381 A1 | 5/2009 | |
| WO | 2010/053356 A2 | 5/2010 | |

OTHER PUBLICATIONS

U.S. Appl. No. 61/041,484, filed Apr. 11, 2008.
U.S. Appl. No. 61/112,595, filed Nov. 7, 2008.
U.S. Appl. No. 61/101,337, filed Sep. 30, 2008.
U.S. Appl. No. 61/112,006, filed Nov. 6, 2008.

U.S. Appl. No. 61/112,374, filed Nov. 7, 2008.
U.S. Appl. No. 61/096,545, filed Sep. 12, 2008.
U.S. Appl. No. 61/096,750, filed Sep. 12, 2008.
Draka, Product Specification for BendBright Single Mode Optical Fibre, Issue date Oct. 2007.
Draka, Product Specification for Enhanced Single Mode Optical Fibre (ESMF), Issue date Oct. 2007.
Draka, Product Specification for BendBright XS Single Mode Optical Fibre, Issue date Oct. 2007.
Draka, Product Specification for Cabling Options-Optical Fiber Types, Issue date May 26, 2006.
Overton et al., Microbending-Resistant Fiber, Draka Communications, IWCS Proceedings (Nov. 2008).
Overton, et al., New Optical Fiber Coating System Optimized for FTTx Applications, Draka Comteq, IWCS Proceedings, Orlando, FL (Nov. 2007).
Draka, Product Specification for Enhanced Single Mode Optical Fibre (ESMF), Issue date Sep. 2008.
Draka, Product Specification for BendBright Single Mode Optical Fibre, Issue date Oct. 2007.
Draka, Product Specification for BendBright XS Single Mode Optical Fibre, Issue date Sep. 2008.
U.S. Appl. No. 61/177,996, filed May 13, 2009.
International Search Report and Written Opinion for International Application No. PCT/US2008/082927, dated Mar. 31, 2009.
Corning, Product Information for "Corning ClearCurve Optical Fiber With Corning nanoStructures Technology," (Feb. 2009).
Ramachandran, et al., "Measurement of Multipath Interference in the Coherent Crosstalk Regime," IEEE Photonics Technology Letters, vol. 15, No. 8, pp. 1171-1173, Aug. 2003.

Zheng et al., "Measurement and System Impact of Multipath Interference From Dispersion Compensating Fiber Modules," IEEE Transaction on Instrumentation and Measurement, vol. 53, No. 1, pp. 15-23, Feb. 2004.
Botineau et al. in "Effective Stimulated Brillouin Gain in Single Mode Optical Fibers," Electronics Letters, vol. 31, No. 23 (1995).
Draka, Product Data Sheet "ezDROP Flat, Dielectric & Toneable Flat Drop Cable," No. DS081, Claremont, NC (2007).
Commonly owned U.S. Appl. No. 12/098,804, filed Apr. 7, 2008.
International Preliminary Report on Patentability for International Application No. PCT/US2008/082927, mailed May 20, 2010.
U.S. Appl. No. 61/147,586, filed Jan. 27, 2009.
U.S. Appl. No. 61/147,590, filed Jan. 27, 2009.
U.S. Appl. No. 61/154,538, filed Feb. 23, 2009.
U.S. Appl. No. 61/248,319, filed Oct. 2, 2009.
U.S. Appl. No. 61/239,055, filed Sep. 1, 2009.
U.S. Appl. No. 61/242,618, filed Sep. 15, 2009.
U.S. Appl. No. 61/155,317, filed Feb. 25, 2009.
U.S. Appl. No. 61/185,462, filed Jun. 9, 2009.
U.S. Appl. No. 61/230,158, filed Jul. 31, 2009.
U.S. Appl. No. 61/241,592, filed Sep. 11, 2009.
U.S. Appl. No. 61/243,626, filed Sep. 18, 2009.
U.S. Appl. No. 61/242,287, filed Sep. 14, 2009.
Commonly owned U.S. Appl. No. 12/774,845, filed May 6, 2010.
Corning, "High Temperature/Harsh Environment Single-mode & Multimode Specialty Fibers," PI 1500, Issued Jan. 2008.

* cited by examiner

REDUCED-SIZE FLAT DROP CABLE

CROSS-REFERENCE TO PRIORITY APPLICATIONS

This application is a continuation-in-part of U.S. patent application Ser. No. 12/267,732 for a Microbend-Resistant Optical Fiber (filed Nov. 10, 2008, and published Jul. 9, 2009, as U.S. Patent Application Publication No. 2009/0175583 A1), which itself claims the benefit of U.S. Provisional Application No. 60/986,737 for a Microbend-Resistant Optical Fiber (filed Nov. 9, 2007), U.S. Provisional Application No. 61/041,484 for a Microbend-Resistant Optical Fiber (filed Apr. 1, 2008), and U.S. Provisional Application No. 61/112,595 for a Microbend-Resistant Optical Fiber (filed Nov. 7, 2008).

This application further claims the benefit of U.S. Provisional Application No. 61/112,912 for a Reduced-Size Flat Drop Cable with Bend-Insensitive Fiber (filed Nov. 10, 2008), U.S. Provisional Application No. 61/177,996 for a Reduced-Diameter Optical Fiber (filed May 13, 2009), and U.S. Provisional Application No. 61/248,319 for a Reduced-Diameter Optical Fiber (filed Oct. 2, 2009).

Each of the foregoing commonly assigned patent applications and patent publication is hereby incorporated by reference in its entirety.

FIELD OF THE INVENTION

The present invention embraces optical fibers possessing an improved coating system that reduces stress-induced microbending. The present invention further embraces the deployment of such optical fibers in improved drop-cable structures.

BACKGROUND OF THE INVENTION

Fiber to the premises/business/home (i.e., FTTx) provides broadband data transfer technology to the individual end-user. FTTx installations, which are being increasingly deployed throughout the world, are making use of innovative, reduced-cost system designs to promote the spread of the technology. For example, fiber may be delivered in the last link by way of a microcable. Air-blown fibers provide another efficient model for delivering the link to the end-use terminus. There continues to be industry-wide focus on modes of deployment that overcome economic obstacles that impede fiber-based broadband solutions for data transmission to businesses and residences.

Cost-effectiveness is important, of course, for achieving successful FTTx systems. Reduced size for cables, drops, and structures for blowing are often critical, too. Installation of conduits suitable for traditional cable designs is often prohibitive in existing infrastructure. Thus, existing small ducts or tight pathways have to be used for new fiber installations. Low-cost and reduced-size requirements are driving in a direction that reduces protection for the optical fibers (i.e., away from conventionally robust, more bulky cable designs).

Glass designs are now available that offer reduced sensitivity to small bending radius (i.e., decreased added attenuation due to the phenomenon known as macrobending). These include trench-assisted core design or void-assisted fibers. Glass designs with lower mode field diameter are less sensitive to macrobending effects, but are not compatible with the G.652 SMF standard. Single-mode optical fibers that are compliant with the ITU-T G.652.D requirements are commercially available, for instance, from Draka Comteq (Claremont, N.C.).

Microbending is another phenomenon that induces added loss in fiber signal strength. Microbending is induced when small stresses are applied along the length of an optical fiber, perturbing the optical path through microscopically small deflections in the core.

In this regard, U.S. Pat. No. 7,272,289 (Bickham et al.), which is hereby incorporated by reference in its entirety, proposes an optical fiber having low macrobend and microbend losses. U.S. Pat. No. 7,272,289 broadly discloses an optical fiber possessing (i) a primary coating having a Young's modulus of less than 1.0 MPa and a glass transition temperature of less than −25° C. and (ii) a secondary coating having a Young's modulus of greater than 1,200 MPa.

Nonetheless, better protection against microbending is still needed to help ensure successful deployment in more FTTx applications. To this end, it is necessary to discover and implement new coating systems that better address the demands FTTx installations place on fiber and cable structures in a way that is commercially practical (i.e., cost-effective).

SUMMARY OF THE INVENTION

Accordingly, it is an object of the present invention to provide an optical fiber having an improved coating system that provides improved protection against stress-induced microbending.

It is another object to provide an improved coating system that can be readily mated with either single-mode optical fiber or multimode optical fiber.

It is yet another object to provide an improved coating system that can be readily mated with bend-insensitive optical fiber.

It is yet another object to provide an improved optical fiber coating system including a primary coating that possesses a low modulus to provide enhanced cushioning against lateral and axial stresses induced by external forces.

It is yet another object to provide an improved optical fiber coating system including a primary coating that possesses an exceptionally low glass transition temperature ($T_g$) that reduces temperature-induced stresses in unusually cold environments.

It is yet another object to provide an improved optical fiber coating system including a primary coating that possesses an improved curing rate.

It is yet another object to provide an improved optical fiber coating system including an ink-free secondary coating that has improved brightness and visibility.

It is yet another object to provide an improved optical fiber coating system that can be applied at commercial processing speeds (e.g., forming the primary coating at rates of at least about 20 meters per second).

It is yet another object to provide an optical fiber possessing coatings that are readily stripped.

It is yet another object to provide an optical fiber having enhanced performance characteristics for use in FTTx installations in which conventional, robust cable designs are impractical.

It is yet another object to provide an optical fiber that synergistically combines a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

It is yet another object to provide an optical fiber that can be advantageously deployed in buffer tubes and/or fiber optic cables.

It is yet another object to provide an optical fiber that requires less external protection (e.g., enclosed within thinner buffer tubes and/or cable jacketing).

It is yet another object to provide a bend-insensitive optical fiber possessing a reduced diameter (e.g., having thinner coating layers and/or a thinner component glass fiber).

It is yet another object to provide a reduced-diameter optical fiber that requires less deployment space (e.g., within a buffer tube and/or fiber optic cable), thereby facilitating increased fiber count and/or reduced cable size.

It is yet another object to provide an optical fiber that can be installed in a way that employs small-radius bends.

It is yet another object to provide an optical fiber that facilitates direct installation onto buildings or other structures (e.g., stapled or otherwise secured to structural surfaces).

It is yet another object to provide a 200-micron single-mode optical fiber that provides significantly better microbending performance than that of a standard single-mode optical fiber (SSMF) that employs conventional primary and secondary coatings (i.e., at an outer diameter of about 235-265 microns).

The foregoing, as well as other objectives and advantages of the invention, and the manner in which the same are accomplished, are further specified within the following detailed description and its accompanying drawings.

DETAILED DESCRIPTION

Figure 1:
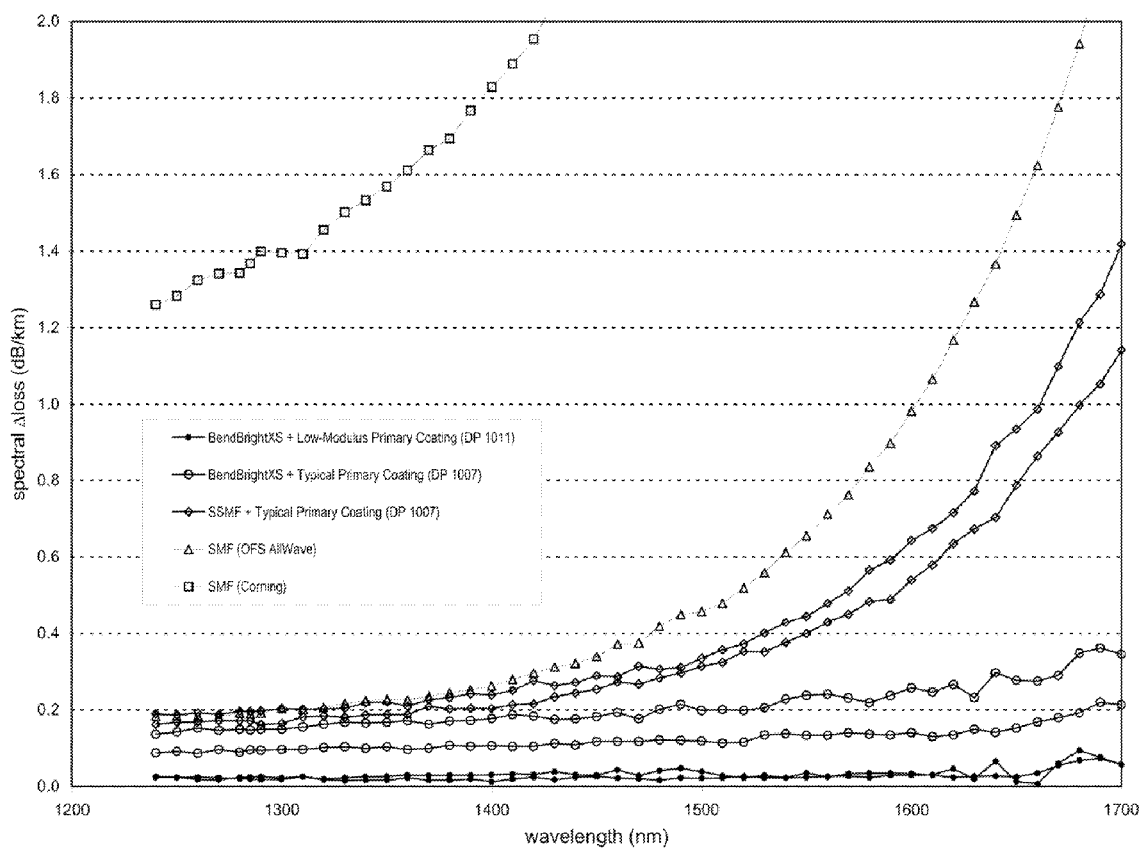
FIG. 1 depicts microbend testing results demonstrating that exceptionally low microbending losses are achieved, in accordance with the present invention, by pairing a bend-insensitive glass fiber with a low-modulus primary coating.

In one aspect, the present invention embraces optical fibers possessing an improved coating system that reduces stress-induced microbending, even in exceptionally cold environments required for FTTx deployments. The coating system according to the present invention includes a primary coating that combines low in situ modulus (e.g., less than about 0.5 MPa as measured on the fiber) and low glass transition temperature ($T_g$) (e.g., less than about −50° C.) to reduce stresses caused by external force and temperature. In addition, the coating system can be processed at high production speeds (e.g., 15-20 m/sec or more).

The present invention achieves a microbend-resistant optical fiber, particularly a single-mode optical fiber, by employing as its primary coating a UV-curable, urethane acrylate composition. In this regard, the primary coating includes between about 40 and 80 weight percent of polyether-urethane acrylate oligomer as well as photoinitiator, such as LUCIRIN® TPO, which is commercially available from BASF. In addition, the primary coating includes one or more oligomers and one or more monomer diluents (e.g., isobornyl acrylate), which may be included, for instance, to reduce viscosity and thereby promote processing. A suitable composition for the primary coating according to the present invention is a UV-curable urethane acrylate product provided by DSM Desotech (Elgin, Ill.) under the trade name DeSolite® DP 1011.

In this regard, this application incorporates entirely by reference the following commonly assigned patent application publications and patent applications: U.S. Patent Application No. 60/986,737 for a Microbend-Resistant Optical Fiber, filed Nov. 9, 2007, (Overton); U.S. Patent Application No. 61/041,484 for a Microbend-Resistant Optical Fiber, filed Apr. 1, 2008, (Overton); U.S. Patent Application No. 61/112,595 for a Microbend-Resistant Optical Fiber, filed Nov. 7, 2008, (Overton); International Patent Application Publication No. WO 2009/062131 A1 for a Microbend-Resistant Optical Fiber, (Overton); and U.S. Patent Application Publication No. US2009/0175583 A1 and its counterpart U.S. patent application Ser. No. 12/267,732 for a Microbend-Resistant Optical Fiber, (Overton).

This application further incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Patent Application Publication No. US2007/0127878 A1 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. patent application Ser. No. 12/098,804 for a Transmission Optical Fiber Having Large Effective Area (Sillard et al.), filed Apr. 7, 2008; U.S. Patent Application Publication No. US2009/0252469 A1 for a Dispersion-Shifted Optical Fiber (Sillard et al.); U.S. patent application Ser. No. 12/436,423 for a Single-Mode Optical Fiber Having Reduced Bending Losses, filed May 6, 2009, (de Montmorillon et al.); U.S. patent application Ser. No. 12/436,484 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. patent application Ser. No. 12/498,439 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); and U.S. patent application Ser. No. 12/614,172 for a Multimode Optical System, filed Nov. 6, 2009, (Gholami et al.); U.S. Patent Application No. 61/101,337 for a Bend-Insensitive Optical Fiber, filed Sep. 30, 2008, (de Montmorillon et al.); U.S. Patent Application No. 61/112,006 for a Bend-Insensitive Single-Mode Optical Fiber, filed Nov. 6, 2008, (de Montmorillon et al.); U.S. Patent Application No. 61/112,374 for a Bend-Insensitive Single-Mode Optical Fiber, filed Nov. 7, 2008, (de Montmorillon et al.).

One exemplary glass fiber, for instance, possesses a step-index core having a refractive index that is between about 0.003 and 0.006 higher than the refractive index of its adjacent silica cladding.

Exemplary single-mode glass fibers for use in the present invention are commercially available from Draka Comteq (Claremont, N.C.) under the trade name BendBright®, which is compliant with the ITU-T G.652.D requirements, and the trade name BendBright$^{XS}$®, which is compliant with the ITU-T G.657.A/B and ITU-T G.652.D requirements.

In particular and as set forth herein, it has been unexpectedly discovered that the pairing of a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011) achieves optical fibers having exceptionally low losses (e.g., reductions in microbend sensitivity of at least 10× (e.g., 40× to 100× or more) as compared with a single-mode fiber employing a conventional coating system). Draka Comteq's bend-resistant, single-mode glass fiber available under the trade name BendBright$^{XS}$® employs a trench-assisted design that reduces microbending losses.

FIG. 1 depicts this outstanding result by comparing the aforementioned exemplary single-mode fiber according to the present invention with various single-mode fibers employing conventional coating systems. In this regard, FIG. 1 presents spectral attenuation data by measuring initial spectral attenuation on the optical fiber on a shipping spool, thereby obtaining the peaks and valleys typical of the attenuation across the full spectrum of wavelengths between the limits shown. The optical fiber is then wound onto a sandpaper-covered, fixed-diameter drum (i.e., measurement spool) as described by the IEC fixed-diameter sandpaper drum test (i.e., IEC TR62221, Method B), and another spectral attenuation curve is obtained.

The IEC fixed-diameter sandpaper drum test (i.e., IEC TR62221, Method B) provides a microbending stress situation that affects single-mode fibers even at room temperature. The sandpaper, of course, provides a rough surface that subjects the optical fiber to thousands, if not millions, of stress points. With respect to the test data presented in FIG. 1, a 300-mm diameter fiber spool was wrapped with adhesive-backed, 40-micron grade sandpaper (i.e., approximately equivalent to 300-grit sandpaper) to create a rough surface. Then, 400-meter fiber samples were wound at about 2,940 mN (i.e., a tension of 300 gf on a 300-mm diameter cylinder), and spectral attenuation was measured at 23° C.

The curves presented in FIG. 1 represent the difference between the initial spectral curve and the curve when the fiber is on the sandpaper drum, thereby providing the added loss due to microbending stresses.

Those having ordinary skill in the art will recognize cable designs are now employing smaller diameter buffer tubes and less expensive materials in an effort to reduce costs. Consequently, when deployed in such cable designs, single-mode optical fibers are less protected and thus more susceptible to stress-induced microbending. As noted, the present invention provides an improved coating system that better protects optical fibers against stresses caused by external mechanical deformations and by temperature-induced, mechanical property changes to the coatings.

As noted, conventional solutions for protecting optical fibers involved using large-diameter buffer tubes, buffer tubes made of high-modulus materials that resist deformation and stresses upon the fiber, and stronger, thicker cable jackets to resist deformations that might pinch or otherwise squeeze the optical fibers. These solutions, however, are not only costly, but also fail to address the temperature-induced stresses caused by changes to the protective coatings. In other words, conventional primary coatings possess high modulus at temperatures below their respective glass transition temperatures.

As disclosed herein, the optical fiber according to the present invention includes a primary coating possessing lower modulus and lower glass transition temperature than possessed by conventional single-mode fiber primary coatings. Even so, the improved primary coating formulation nonetheless facilitates commercial production of the present optical fiber at excellent processing speeds (e.g., 1,000 m/min or more). In this regard, the primary coating employed in the optical fibers of the present invention possesses fast curing rates—reaching 50 percent of full cure at a UV dose of about 0.3 J/cm$^2$, 80 percent of full cure at a UV dose of about 0.5 J/cm$^2$, and 90 percent of full cure at a UV dose of about 1.0 J/cm$^2$ as measured on a standard 75-micron film at 20° C. and atmospheric pressure (i.e., 760 ton) (i.e., standard temperature and pressure—STP).

Figure 2:
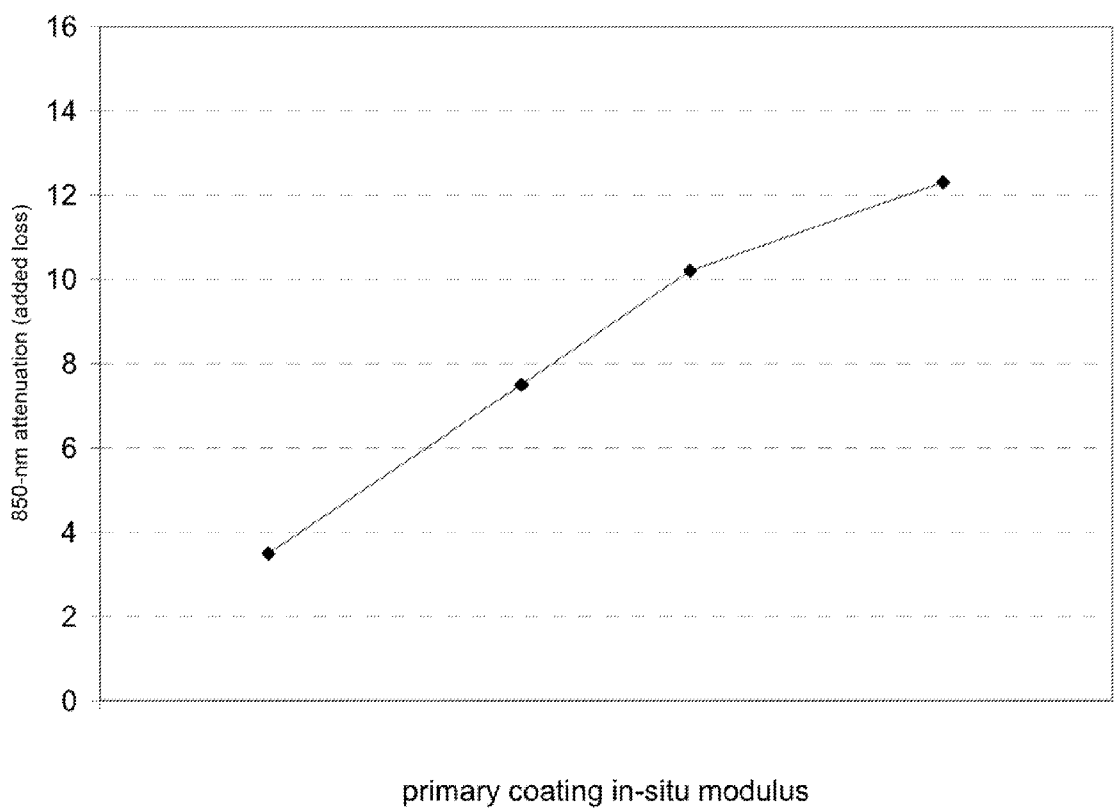
FIG. 2 schematically depicts the relationship between the in situ modulus of a primary coating and added loss for a multimode optical fiber.

FIG. 2 schematically depicts the observed relationship between the in situ modulus of a primary coating and the attenuation (added loss) of the optical fiber, here a 50-micron graded-index multimode fiber. The primary coating modulus is measured as cured on the glass fiber and the added loss is measured using a fixed-diameter sandpaper drum procedure in accordance with the IEC TR62221 microbending-sensitivity technical report and standard test procedures (e.g., IEC TR62221, Method B, Ed. 1), which are hereby incorporated by reference in their entirety.

As will be appreciated by those having ordinary skill in the art, prior, commercially available single-mode fibers typically include a Young's modulus of 100-150 psi measured in situ (i.e., on the fiber). The optical fiber according to the present invention possesses a primary coating having reduced modulus as compared with such commercially available primary coatings. Employing a lower modulus primary coating provides better cushioning around the glass fiber.

Although lower modulus of the in situ primary coating can be achieved by selectively undercuring, the present invention achieves in situ primary coating having lower modulus even approaching full cure (i.e., near full cure). In this regard, the modulus of the in situ primary coating according to the present invention is less than about 0.65 MPa (e.g., less than about 95 psi), typically less than about 0.5 MPa, and more typically less than 0.4 MPa (e.g., between about 0.3 MPa and 0.4 MPa or between about 40 psi and 60 psi). It has been determined that an in situ primary coating having a modulus of less than about 0.5 MPa significantly reduces bend sensitivity of the glass fiber. On the other hand, the modulus of the in situ primary coating according to the present invention is typically greater than about 0.2 MPa (e.g., 0.25 MPa or more).

To achieve its reduced modulus as compared with conventional optical fiber coatings, the present primary coating possesses a lower crosslink density, specifically a reduced concentration of the reactive acrylate groups. Those having ordinary skill in the art will appreciate that acrylate groups crosslink via free radical polymerization during photoinitiation (e.g., UV-induced curing during drawing operations). The reaction kinetics dictate reduced cure rates during processing. This is commercially undesirable, of course, and so the present invention implements processing modifications to provide satisfactory cure rate for the low-modulus primary coating.

There are at least two components of the curing process that retard the rate of polymerization of the primary coating. First, the combination of (i) high curing temperatures induced by exposure to a high-intensity, UV environment and (ii) the exothermic polymerization reaction slows the observed curing rate of the primary coating. Second, close proximity of stacked UV lamps, in effect, creates rapidly superposed, repeated photoinitiation periods. The reaction rate of acrylate groups under this configuration is likewise retarded—a somewhat counterintuitive result. With respect to the latter, disposing (i.e., positioning) UV lamps to increase the period between consecutive UV exposures significantly increases the degree of coating cure as compared with other conventional processes employing the same draw speed and UV dose. In this way, it is possible to process the reduced-modulus, primary coating according to the present invention in a way that achieves near-complete curing at fast fiber draw speeds, which are required for a commercially viable process. An exemplary method and apparatus for curing a coated fiber is disclosed in commonly assigned U.S. Pat. No. 7,322,122, which is hereby incorporated by reference in its entirety.

The temperature dependence of the modulus is an important consideration to ensure that the primary coating provides enhanced microbending protection in FTTx applications. A primary coating having low modulus only at room temperature would be inadequate because deployment in the field will expose the optical fiber to microbend-inducing stresses at extreme environmental temperatures (e.g., −40° C. and below). Therefore, a suitable primary coating according to the present invention possesses an exceptionally low glass transition temperature so that the primary coating remains soft and protective in extremely cold environmental conditions.

EXAMPLE 1

Comparison of Mechanical Properties

Figure 3:
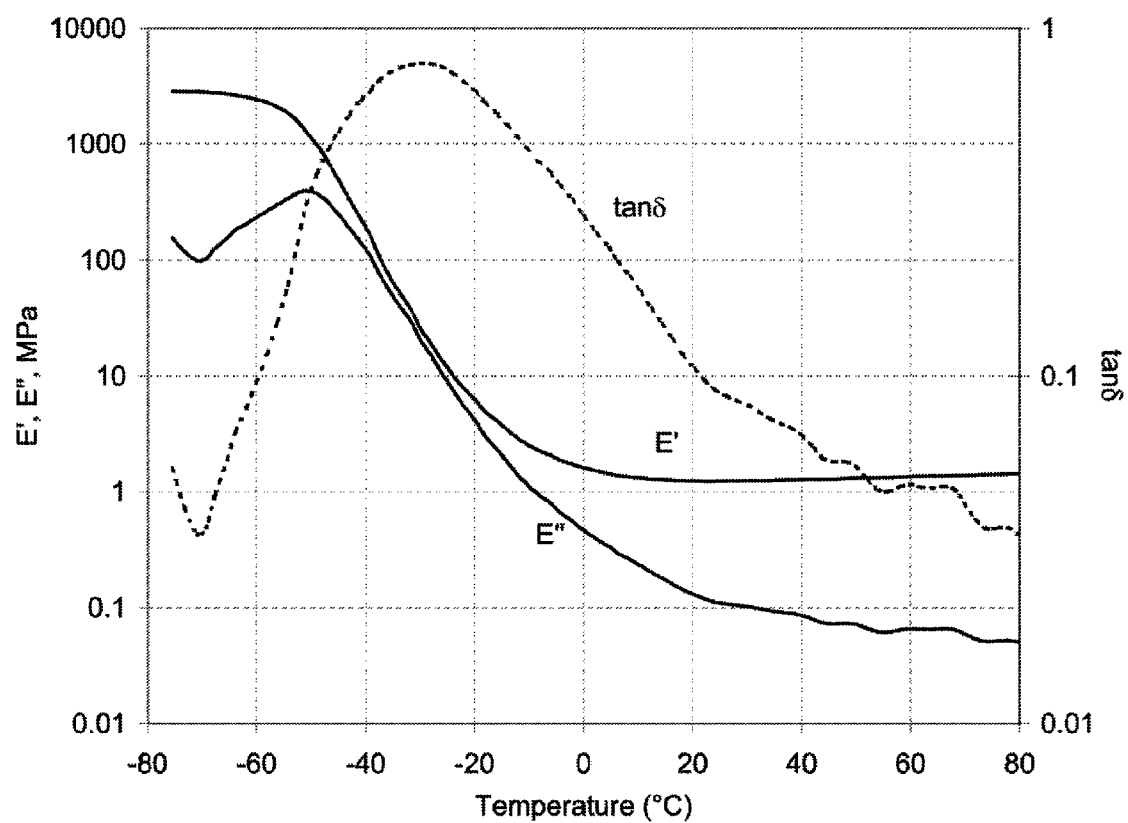
FIG. 3 depicts the dynamic mechanical properties of a typical commercial primary coating (i.e., a conventional primary coating).
Figure 4:
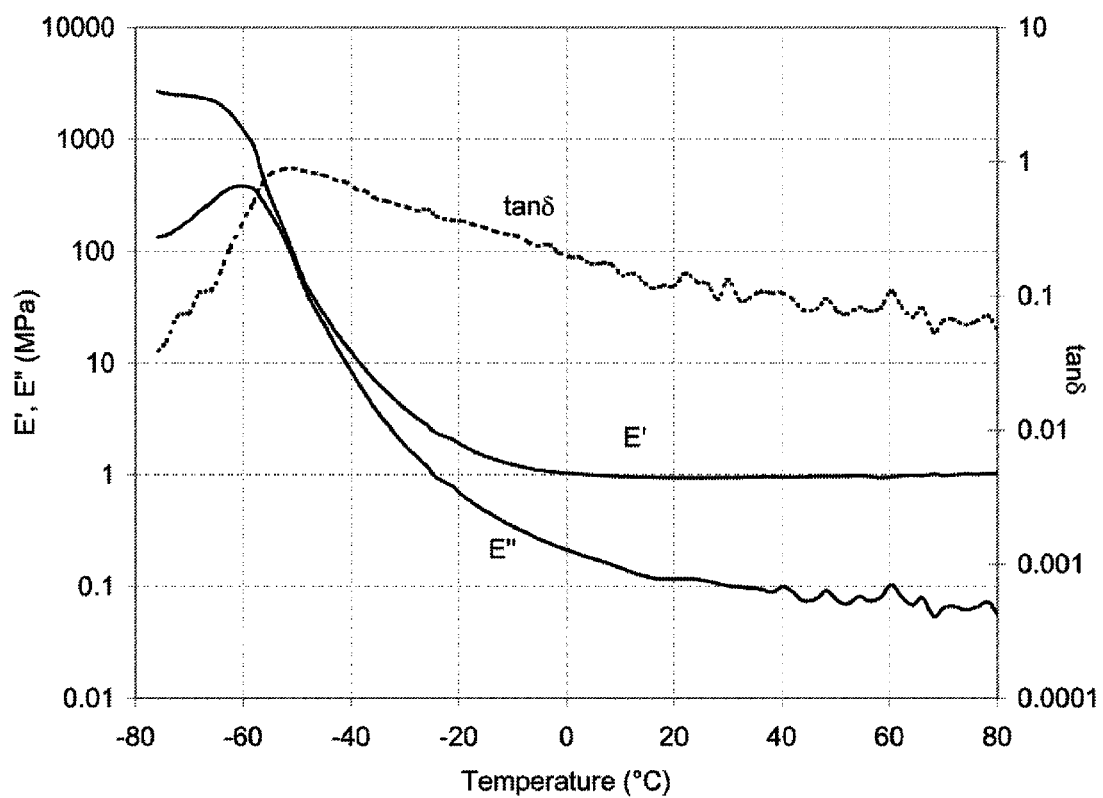
FIG. 4 depicts the dynamic mechanical properties of an exemplary primary coating used in producing optical fibers according to the present invention.

FIGS. 3 and 4, respectively, depict dynamic mechanical properties of a typical commercial primary coating (i.e., the conventional primary coating) and an exemplary primary coating used in making the optical fibers according to the present invention. The conventional primary coating was a UV-curable urethane acrylate provided by DSM Desotech (Elgin, Ill.) under the trade name DeSolite® DP 1007. The exemplary primary coating according to the present invention (i.e., employed to form optical fibers of the present invention) was a UV-curable urethane acrylate provided by DSM Desotech (Elgin, Ill.) under the trade name DeSolite® DP 1011.

The data for the conventional primary coating were obtained on a Dynamic Mechanical Analyzer (DMA) at an oscillatory stress rate of 1 Hz. In doing so, the strain was maintained within the linear region of stress-strain behavior. The sample of conventional primary coating was cured on polyester to form a standard 75-micron film. A UV dose of 1 J/cm$^2$ was applied using a mercury-halide bulb operating at a 300 W/in output. This UV exposure was sufficient to ensure that the coating was on the plateau of the dose-modulus curve.

Referring to FIG. 3, the data show the equilibrium modulus to be approximately 1.5 MPa as measured on a 75-micron film. On a glass fiber (i.e., in situ), this conventional primary coating typically cures well to a modulus of about 0.8 MPa, a level indicative of many single-mode fiber primary coatings in the industry. Those having ordinary skill in the art will appreciate that modulus measurements of softer primary coatings tend to be lower on a glass fiber (i.e., in situ) as compared with on a 75-micron film.

The glass transition temperature of the conventional primary coating is estimated by the peak in tanδ to be approximately −30° C. Thus, the conventional primary coating (and similar formulations) will behave like a glassy polymer at extremely low temperatures (e.g., less than −40° C., particularly less than −50° C.). (Although stress induced by strain is time dependent at low temperatures, estimated glass transition temperature is a useful comparative property.)

A sample of the exemplary primary coating according to the present invention was likewise cured on polyester to form a comparable 75-micron film. As before, a UV dose of 1 J/cm$^2$ was applied to the primary coating using a mercury-halide bulb operating at a 300 W/in output. As noted, FIG. 4 depicts dynamic mechanical properties of the exemplary primary coating according to the present invention.

The exemplary primary coating according to the present invention exhibited an equilibrium modulus at just under 1 MPa in the cured film. The in situ modulus (i.e., measured on the glass fiber), was between about 0.3 MPa and 0.4 MPa. This is significantly lower than the respective modulus measurements for the conventional primary coating.

The glass transition temperature of the exemplary primary coating according to the present invention is estimated by the peak in tanδ at less than about −50° C. (e.g., about −60° C.). This is at least about 20° C. below the glass transition temperature of the comparative, conventional primary coating. Accordingly, primary coatings according to the present invention provide much more rapid stress relaxation during temperature excursions.

As set forth in Examples 2 and 3 (below), two different methods were used to evaluate the respective microbend sensitivities of glass fibers coated with (i) a typical commercial primary coating (i.e., the conventional primary coating) and (ii) an exemplary primary coating according to the present invention. As with Example 1 (above), the conventional primary coating was a UV-curable urethane acrylate provided by DSM Desotech (Elgin, Ill.) under the trade name DeSolite® DP 1007, and the exemplary primary coating according to the present invention (i.e., employed to form optical fibers of the present invention) was a UV-curable urethane acrylate provided by DSM Desotech (Elgin, Ill.) under the trade name DeSolite® DP 1011.

Each test method provided aggravated lateral stress conditions. Moreover, after measuring the effect on attenuation at room temperature, the test structures were temperature cycled to determine the additional loss induced by such temperature excursions.

EXAMPLE 2

Comparison of Microbending Sensitivity

The first test method employed was a basket-weave, temperature cycling procedure known by those having ordinary skill in the art. According to this test procedure, optical fiber was wound at about 490 mN (i.e., a tension of 50 gf on a 300-mm diameter quartz cylinder with a 9-mm "lay"). Fifty layers were wound on the quartz drum to create numerous fiber-to-fiber crossovers. The testing procedure for Example 2 was an adaptation of IEC TR62221, Method D, which, as noted, is incorporated by reference in its entirety.

Those having ordinary skill in the art will appreciate that, at room temperature, such fiber crossovers can sometimes cause added loss (i.e., if the optical fiber is very sensitive) but that typically little or no added loss is observed. Consequently, the drum (with wound fiber) was temperature cycled twice from about room temperature through (i) –40° C., (ii) –60° C., (iii) +70° C., and (iv) +23° C. (i.e., near room temperature) while making loss measurements at 1550 nanometers. In both temperature cycles, fiber attenuation was measured after one hour at each test temperature.

Figure 5:
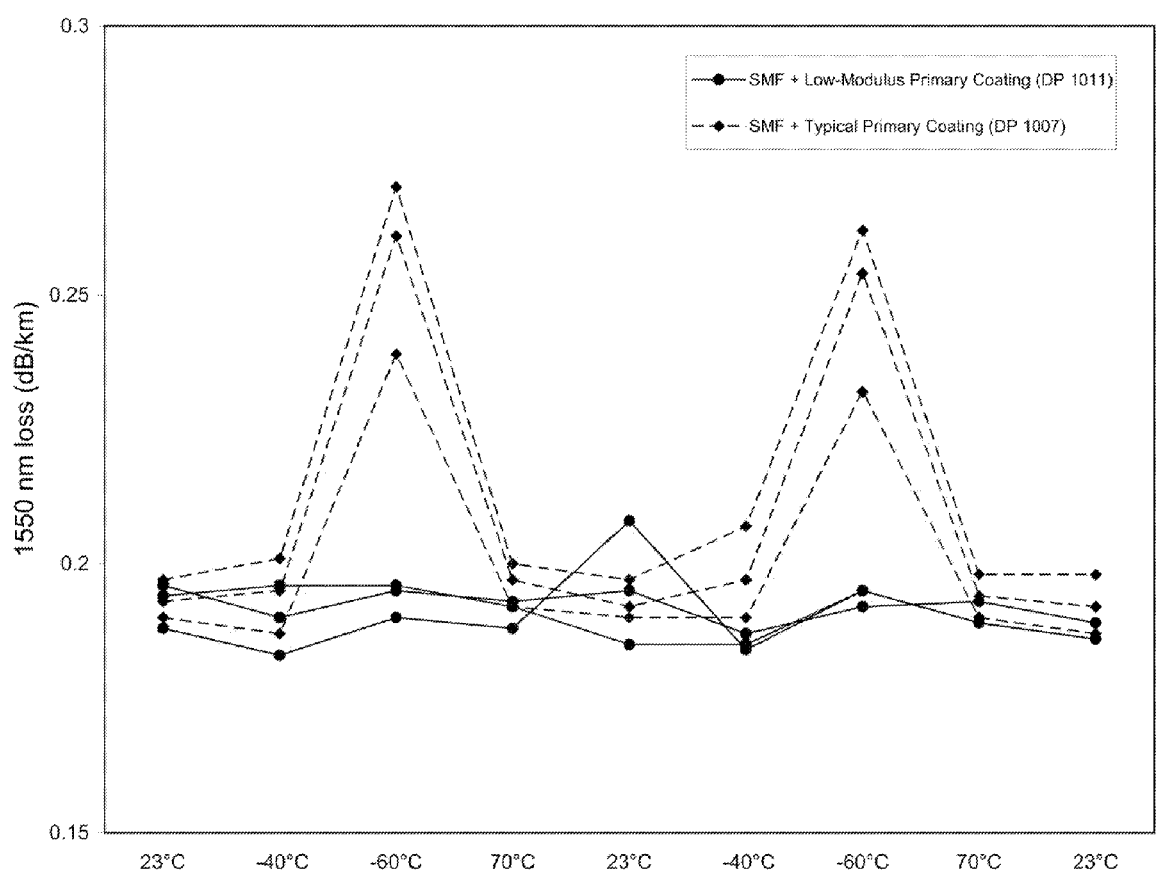
FIG. 5 depicts microbend testing results for optical fibers that include a conventional primary coating and for optical fibers that include an exemplary primary coating according to the present invention.

FIG. 5 depicts exemplary results for single-mode glass fibers coated with, respectively, a conventional primary coating (i.e., DeSolite® DP 1007) and an exemplary primary coating according to the present invention (i.e., DeSolite® DP 1011). The respective fiber specimens were chosen to match the coating geometry, mode field diameter, and cutoff wavelength. Accordingly, the respective optical fibers employed different formulations of colored secondary coatings.

In summary, the conventional primary coating and the exemplary primary coating according to the present invention each provided good protection against microbending stresses at 23° C. Moreover, at –40° C., the optical fiber having the conventional primary coating demonstrated only a small added loss. (It would appear that at –40° C., the conventional primary coating provided adequate protection against microbending by stress relaxing in a reasonable timeframe, even though this was near its glass transition temperature.) By way of comparison, the optical fiber according to the present invention demonstrated essentially no added loss at –40° C. (i.e., better performance).

At –60° C., however, the optical fiber having the conventional primary coating demonstrated significant added loss. (This temperature extreme was well below the glass transition temperature of the conventional primary coating.) By way of comparison, the optical fiber according to the present invention demonstrated essentially no added loss at –60° C., which is close to the glass transition temperature of this embodiment of the primary coating according to the present invention.

EXAMPLE 3

Comparison of Microbending Sensitivity

The second test method employed more aggressive environments (i.e., conditions) in order to evaluate the respective microbend sensitivities of (i) an optical fiber possessing a typical commercial primary coating (i.e., the conventional primary coating) and (ii) an optical fiber possessing an exemplary primary coating according to the present invention.

In particular, the second method modified the IEC fixed-diameter sandpaper drum test (i.e., IEC TR62221, Method B), which, as noted, is incorporated by reference in its entirety, to provide a microbending stress situation sufficiently harsh to affect single-mode fibers even at room temperature (i.e., a rougher drum surface than that used to measure the data depicted in FIG. 1). To do this, a 300-mm diameter quartz drum was wrapped with adhesive-backed, 220-grit sandpaper (i.e., approximately equivalent to 66-micron-grade sandpaper) to create a rough surface.

In an initial test condition, each of the respective fiber samples was wound in a single layer at about 980 mN (i.e., a tension of 100 gf on a 300-mm diameter quartz cylinder). In a modified test condition, three (3) each of the respective fiber samples was wound in a single layer at about 1,470 mN (i.e., a tension of 150 gf on a 300-mm diameter quartz cylinder). Thus, as compared with the first test condition, the second test condition increased the winding tension by 50 percent.

Using matched fiber samples (as with the basket weave/temperature cycling test of Example 2) fiber attenuation was measured after winding at room temperature (i.e., 23° C.) for each test condition. Then, the drum (with 400 meters of wound fiber) was temperature cycled from about room temperature through (i) –40° C., (ii) –60° C., and (iii) +23° C. (i.e., near room temperature) while making loss measurements at 1550 nanometers using an optical time domain reflectometer (OTDR).

The several samples of each kind of optical fiber were initially measured at 23° C. on the original spools (i.e., before winding on the roughened drum surface to establish baseline spectral attenuation) then were subjected to the foregoing rigorous testing conditions for one hour at each temperature. Fiber attenuation was measured after one hour (as in Example 2) at each test temperature.

Figure 6:
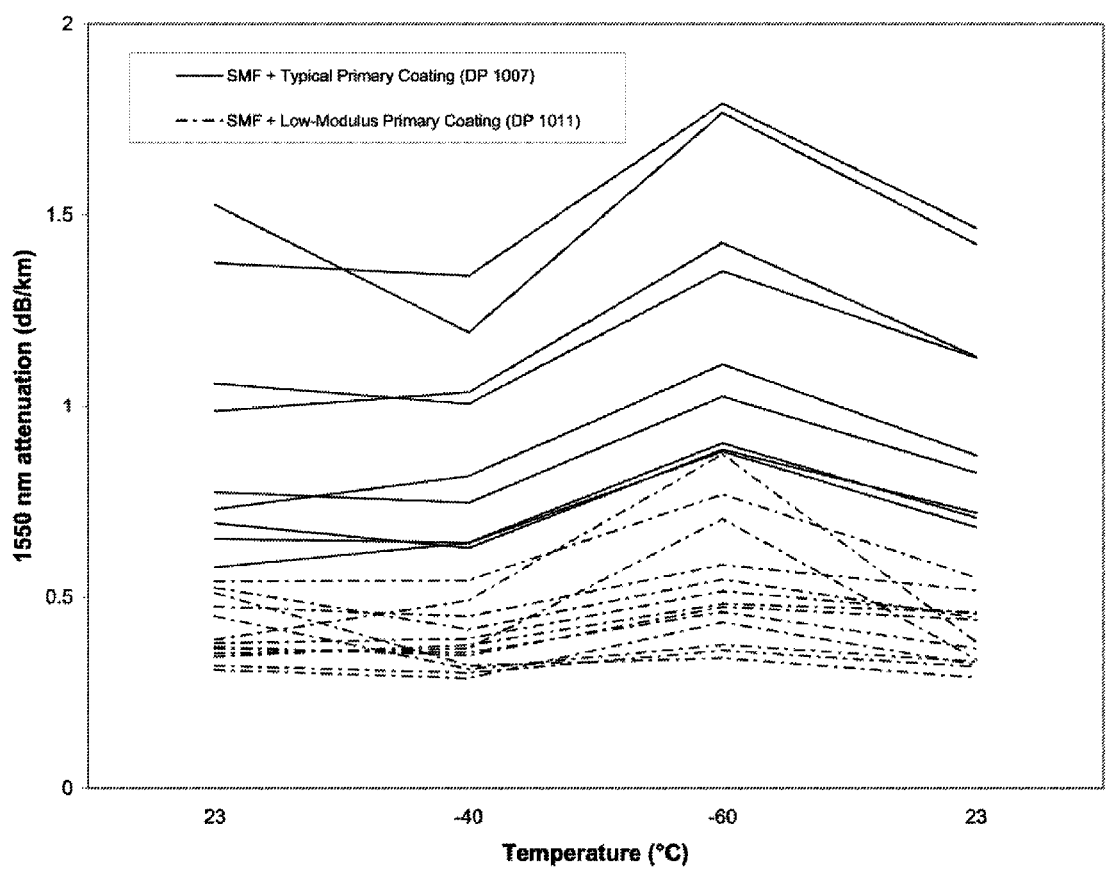
FIG. 6 depicts microbend testing results (under rigorous temperature-cycle testing conditions) for optical fibers that include a conventional primary coating and for optical fibers that include an exemplary primary coating according to the present invention.
Figure 7:
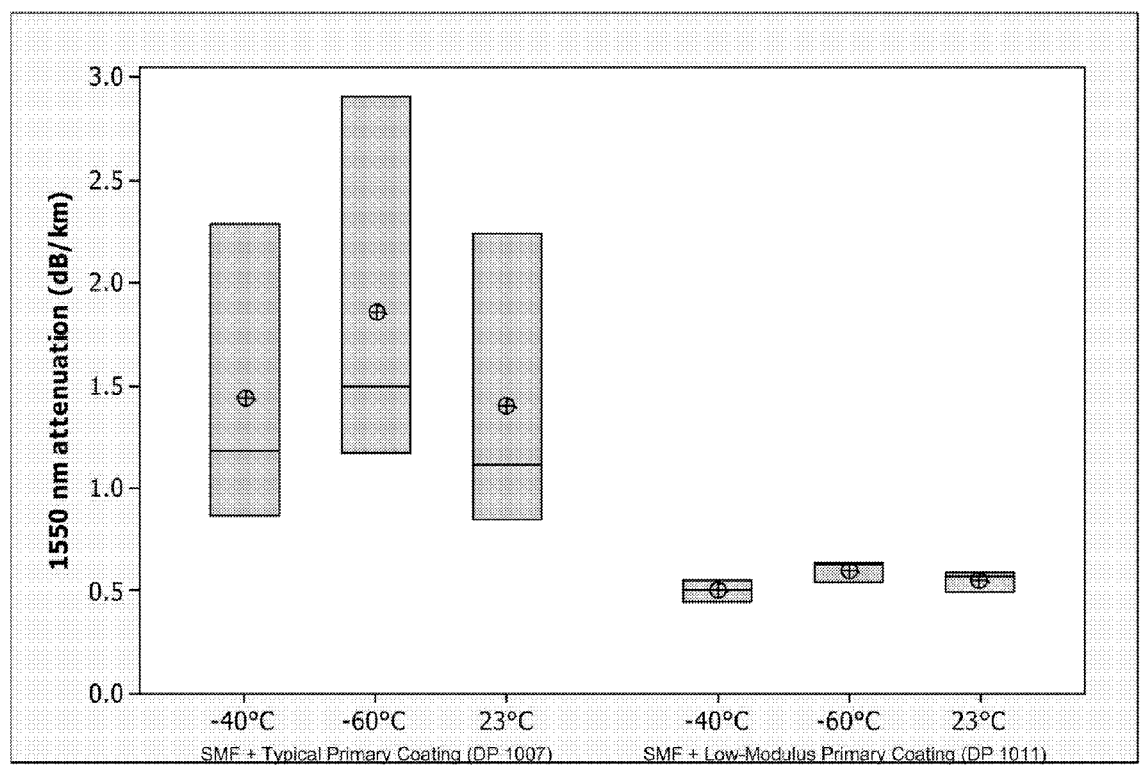
FIG. 7 depicts microbend testing results (under modified temperature-cycle testing conditions) for optical fibers that include a conventional primary coating and for optical fibers that include an exemplary primary coating according to the present invention.

FIG. 6, a line chart, and FIG. 7, a box plot, depict exemplary results under these more rigorous testing conditions for single-mode optical fibers that include a conventional primary coating (i.e., DeSolite® DP 1007 UV-curable urethane acrylate) and for single-mode optical fibers that include an exemplary primary coating according to the present invention (i.e., DeSolite® DP 1011 UV-curable urethane acrylate).

FIG. 6, for instance, shows that, as compared with conventional optical fibers, exemplary optical fibers according to the present invention possess reduced microbend sensitivity (i.e., a reduction of about 40-60 percent).

Likewise, FIG. 7 shows that, as compared with conventional optical fibers, exemplary optical fibers according to the present invention possess substantially reduced microbend sensitivity at a higher winding tension (i.e., 150 gf on a 300-mm diameter quartz cylinder). FIG. 7 thus illustrates that the exemplary primary coating according to the present invention (i.e., DeSolite® DP 1011 UV-curable urethane acrylate) promotes both significantly reduced and significantly more uniform microbending performance.

In accordance with the foregoing, it has been found that, as compared with a conventional coating system, the present coating system provides significant microbending improvement when used in combination with a conventional single-mode glass fiber.

It has been further found that pairing a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011) achieves optical fibers having exceptionally low losses. Additional testing was performed, therefore, to demonstrate the dramatic and unexpected reductions in microbend sensitivity provided in accordance with the present invention.

EXAMPLE 4

Comparison of Microbending Sensitivity

The respective microbend sensitivities were measured for exemplary optical fibers, including (i) a conventional single-mode glass fiber with a conventional commercial coating, (ii) a bend-insensitive glass fiber with a conventional commercial coating, and (iii) a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

Figure 8:
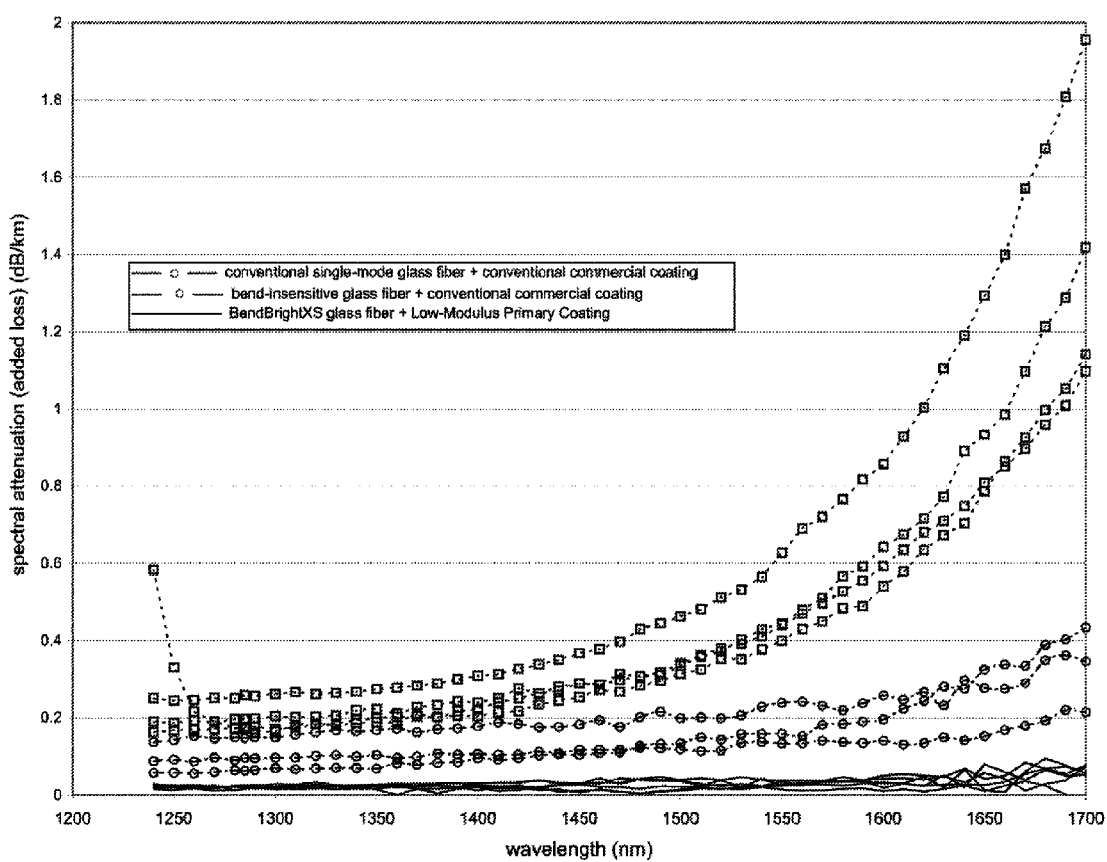
FIG. 8 depicts microbend testing results demonstrating that exceptionally low microbending losses are achieved, in accordance with the present invention, by pairing a bend-insensitive glass fiber with a low-modulus primary coating.

FIG. 8 demonstrates that the optical fiber according to the present invention, namely including a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011), provides exceptionally low attenuation losses as compared with other optical fibers. Moreover, this bend-resistant optical fiber exhibits small wavelength dependence within the transmission window between 1400 nanometers and 1700 nanometers, and is essentially unaffected by the microbend-inducing test conditions across the test spectrum.

FIG. 8 presents exemplary spectral attenuation data obtained adhering to IEC TR62221, Method B (fixed-diameter drum). In accordance with IEC TR62221, Method B, initial spectral attenuation was measured on a 440-meter sample of optical fiber wound on a shipping spool (i.e., obtaining the peaks and valleys typical of the attenuation across the full spectrum of wavelengths between the limits shown). The optical fiber was then wound at about 3 N onto a 300-mm diameter measurement spool wrapped with adhesive-backed, 40-micron grade sandpaper (i.e., approximately equivalent to 300-grit sandpaper), and another spectral attenuation curve was obtained.

Like the curves presented in FIG. 1, the curves depicted in FIG. 8 represent, at 23° C., the difference between the initial spectral curve and the curve when the fiber is on the sandpaper drum of fixed diameter, thereby providing the added loss due to microbending stresses (i.e., delta-attenuation across the spectral range).

EXAMPLE 5

Comparison of Microbending Sensitivity

The respective microbend sensitivities were measured under rigorous test conditions for exemplary optical fibers, including (i) a conventional single-mode glass fiber with a conventional commercial coating and (ii) a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

Figure 9:
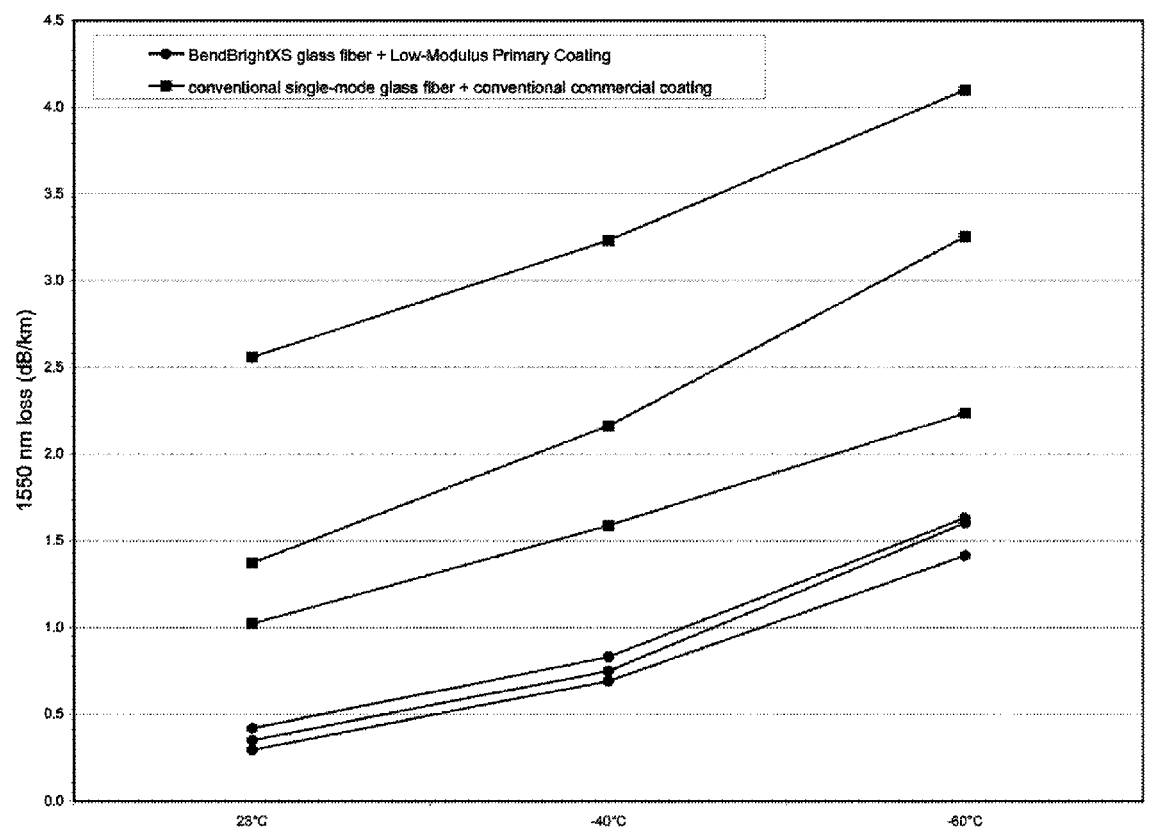
FIG. 9 depicts microbend testing results (under rigorous temperature-cycle testing conditions) for conventional optical fibers and for optical fibers that, in accordance with the present invention, combine a bend-insensitive glass fiber with a low-modulus primary coating.

FIG. 9 demonstrates that, even under extremely harsh conditions, the optical fiber according to the present invention, namely including a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011), provides surprisingly low attenuation losses as compared with other optical fibers.

The testing procedure for Example 5 was an adaptation of IEC TR62221, Method B, which, as noted, is incorporated by reference in its entirety. For this modified IEC fixed-diameter sandpaper drum test, a 300-mm diameter quartz drum was wrapped with adhesive-backed, 180-grit sandpaper (i.e., approximately equivalent to 78-micron-grade sandpaper) to create an even rougher surface than that described in Example 3 (above). Then, 440-meter fiber samples were wound in a single layer at about 1,470 mN (i.e., a controlled back tension of 150 gf on the 300-mm diameter quartz cylinder using a Delachaux optical fiber winding apparatus), and spectral attenuation was measured.

FIG. 9 presents exemplary temperature-cycle data for three specimens of standard single-mode fiber (i.e., a conventional single-mode glass fiber with a conventional commercial coating) and three specimens of optical fiber according to the present invention (i.e., a bend-insensitive glass fiber with improved coating according to the present invention). As noted, 440 meters of optical fiber is wound onto the aforementioned sandpaper-covered, fixed-diameter drum. One hour after winding, fiber attenuation was measured at room temperature (i.e., 23° C.) using an optical time domain reflectometer (OTDR). Then, the drum (with 440 meters of wound fiber) was temperature cycled from about room temperature through (i) −40° C. and (ii) −60° C. in a temperature-controlled chamber. Fiber attenuation at 1550 nanometers was measured by an OTDR after one hour of equilibration at both −40° C. and −60° C.

Microbending sensitivity ($S_m$) may be described as αR/T, wherein α is the attenuation increase on the drum (dB/km), R is the radius of the fixed drum (mm), and T is the winding tension applied to the fiber (N). See e.g., IEC TR62221 Technical Report (Microbending Sensitivity). In addition to the parameters α, R, and T, however, the microbending-sensitivity metric obtained from the fixed-diameter sandpaper drum test is dependent on the coarseness of the sandpaper employed on the measurement drum.

Table 1 (below) presents the microbending-sensitivity metric obtained from the attenuation data (at a wavelength of 1550 nanometers) depicted in FIG. 9 (i.e., employing 180-grit sandpaper). Table 1 shows that, as compared with a conventional standard single-mode fiber, the optical fiber according to the present invention provides microbending sensitivity that is about 2×-10× lower at 23° C. and about 2×-5× lower at −40° C.:

TABLE 1

| | (Microbend Sensitivity) | | |
| --- | --- | --- | --- |
| Optical Fiber (Coating Color) | 23° C. (dB/km)/ (N/mm) | −40° C. (dB/km)/ (N/mm) | −60° C. (dB/km)/ (N/mm) |
| Conventional SMF (blue) | 139.9 | 220.6 | 331.8 |

TABLE 1-continued (Microbend Sensitivity)

| Optical Fiber (Coating Color) | 23° C. (dB/km)/ (N/mm) | −40° C. (dB/km)/ (N/mm) | −60° C. (dB/km)/ (N/mm) |
|---|---|---|---|
| Conventional SMF (red) | 261.0 | 329.7 | 417.9 |
| Conventional SMF (aqua) | 104.3 | 161.9 | 228.0 |
| BendBright$^{XS}$ ® w/ ColorLock$^{XS}$ (slate) | 35.8 | 76.5 | 163.4 |
| BendBright$^{XS}$ ® w/ ColorLock$^{XS}$ (red) | 30.1 | 70.6 | 144.2 |
| BendBright$^{XS}$ ® w/ ColorLock$^{XS}$ (aqua) | 42.7 | 84.7 | 166.4 |

EXAMPLE 6

Comparison of Microbending Sensitivity

The respective microbend sensitivities were further measured for exemplary optical fibers, including (i) a conventional single-mode glass fiber with a conventional commercial coating and (ii) a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

The testing procedure for Example 6 was an adaptation of IEC TR62221, Method B, which, as noted, is incorporated by reference in its entirety. For this modified IEC fixed-diameter sandpaper drum test, a 300-mm diameter quartz drum was wrapped with adhesive-backed, 220-grit sandpaper (i.e., approximately equivalent to 66-micron-grade sandpaper) to create a rough surface like that described in Example 3. Each of the fiber samples was wound in a single layer at about 1,470 mN (i.e., a tension of 150 gf on a 300-mm diameter quartz cylinder). As compared with the test conditions of Example 5, the test conditions of Example 6 employed finer grade sandpaper (i.e., 220-grit rather than 180-grit).

As in Example 3, using matched fiber samples, fiber attenuation was measured after winding at room temperature (i.e., 23° C.). Then, the drum (with about 400 meters of wound fiber) was temperature cycled from about room temperature through (i) −40° C., (ii) −60° C., and (iii) +23° C. (i.e., near room temperature) while making loss measurements at 1550 nanometers using an optical time domain reflectometer (OTDR).

Three (3) samples of each kind of optical fiber were initially measured at 23° C. on the original spools (i.e., before winding on the roughened drum surface to establish baseline spectral attenuation) and then were subjected to the foregoing rigorous testing conditions for one hour at each temperature. Fiber attenuation was measured after one hour at each temperature.

Figure 10:
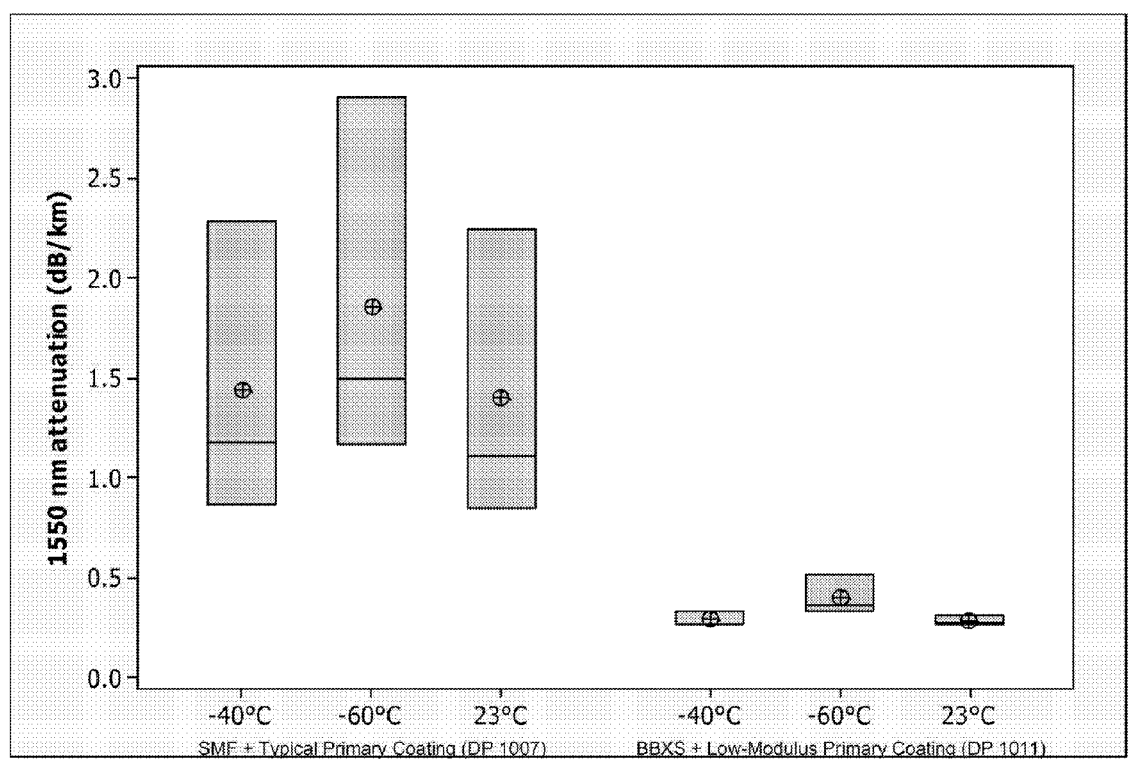
FIG. 10 depicts microbend testing results (under modified temperature-cycle testing conditions) for conventional optical fibers and for optical fibers that, in accordance with the present invention, combine a bend-insensitive glass fiber with a low-modulus primary coating.

FIG. 10 depicts exemplary results for single-mode optical fibers that include a conventional primary coating (i.e., DeSolite® DP 1007 UV-curable urethane acrylate) and for bend-insensitive glass fibers (e.g., Draka Comteq's single-mode glass fibers available under the trade name BendBright$^{XS}$®) that include a primary coating having very low modulus (i.e., DSM Desotech's UV-curable urethane acrylate product provided under the trade name DeSolite® DP 1011).

FIG. 10 demonstrates that the optical fiber according to the present invention, namely Draka Comteq's single-mode glass fibers available under the trade name BendBright$^{XS}$® with a primary coating having very low modulus (e.g., DSM Desotech's UV-curable urethane acrylate product provided under the trade name DeSolite® DP 1011), provides exceptionally low attenuation losses as compared with standard single-mode optical fibers (SSMF).

Figure 11:
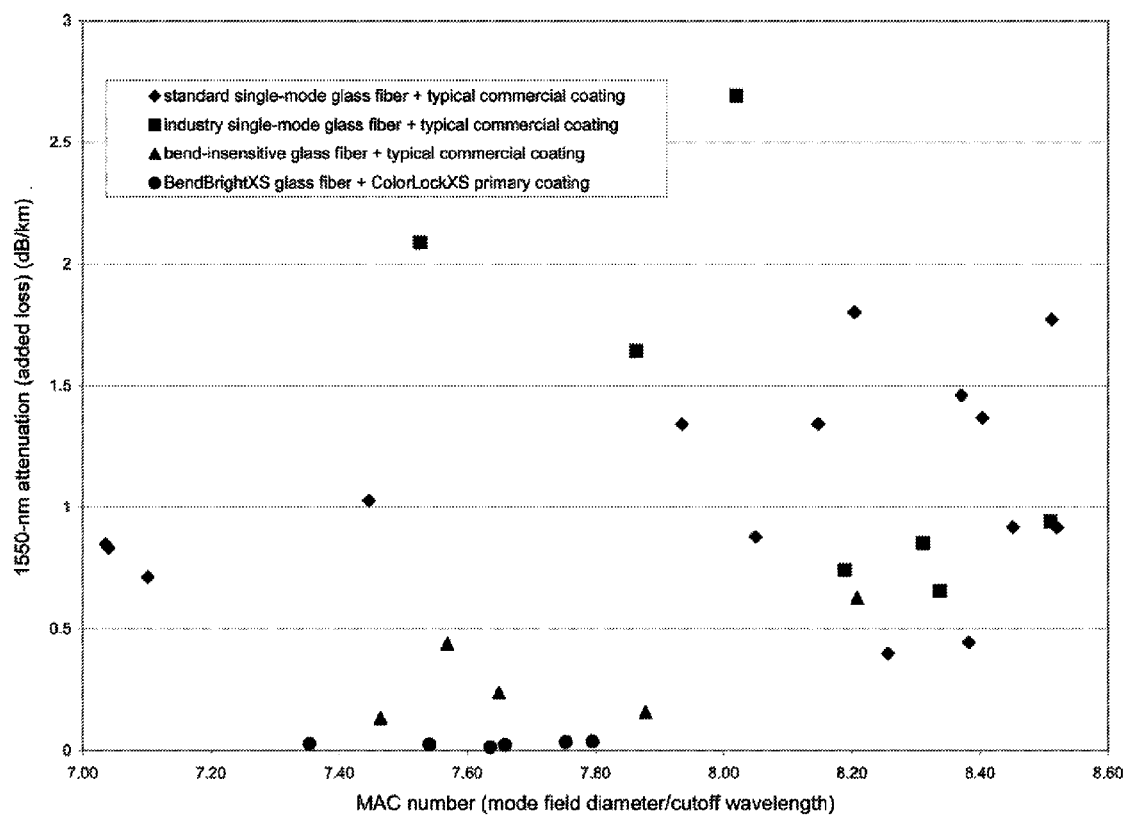
FIG. 11 depicts attenuation (added loss) as a function of MAC number (i.e., mode field diameter divided by cutoff wavelength) for various exemplary optical fibers.
Figure 12:
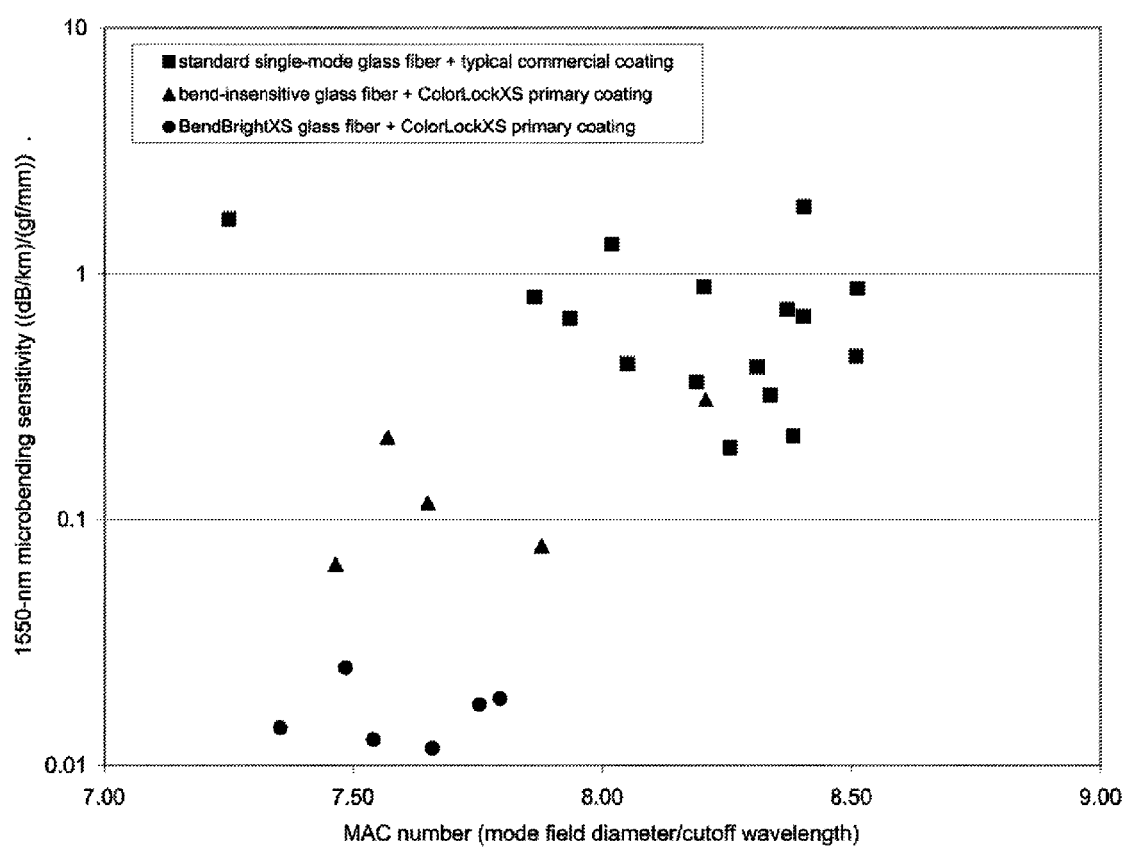
FIG. 12 depicts, on a logarithmic scale, microbend sensitivity as a function of MAC number (i.e., mode field diameter divided by cutoff wavelength) for various exemplary optical fibers.

In addition, FIGS. 11 and 12 depict attenuation and microbend sensitivity, respectively, at a wavelength of 1550 nanometers as a function of MAC number (i.e., mode field diameter divided by cutoff wavelength) for various exemplary optical fibers in accordance with the standard IEC fixed-diameter sandpaper drum test (i.e., IEC TR62221, Method B). The respective attenuation data depicted in FIG. 11 (added loss) and FIG. 12 (microbend sensitivity) were obtained at 23° C. under the test conditions previously described with respect to FIG. 1 (i.e., 400-meter fiber samples were wound at about 2,940 mN (i.e., a tension of 300 gf) on a 300-mm diameter fiber spool wrapped with adhesive-backed, 40-micron grade sandpaper).

FIG. 11 shows that Draka Comteq's bend-resistant, single-mode glass fiber available under the trade name BendBright$^{XS}$® in combination with Draka Comteq's ColorLock$^{XS}$ brand coating system provides outstanding performance with respect to added loss.

FIG. 12 shows that Draka Comteq's bend-resistant, single-mode glass fiber available under the trade name BendBright$^{XS}$® in combination with Draka Comteq's ColorLock$^{XS}$ brand coating system provides superior microbend sensitivity (i.e., microbend sensitivity of 0.01 to 0.03 (dB/km)/(gf/mm)).

The optical fibers according to the present invention typically further include a tough secondary coating to protect the primary coating and glass fiber from damage during handling and installation. For example, the secondary coating might have a modulus of between about 800 MPa and 1,000 MPa (e.g., about 900 MPa) as measured on a standard 75-micron film. As disclosed herein, this secondary coating may be inked as a color code or, preferably, may be color-inclusive to provide identification without the need for a separate inking process.

In one embodiment according to the present invention, the secondary coating, which surrounds the primary coating to thereby protect the fiber structure, features an inclusive coloring system (i.e., not requiring an extra layer of ink to be added for color coding). The colors, which conform to Munsell standards for optical fiber color-coding, are enhanced for brightness and visibility under dim lighting (e.g., in deep shade or in confined spaces, such as manholes) and are easily distinguished against both light and dark backgrounds.

Furthermore, the secondary coating features a surface that provides an excellent interface with ribbon matrix material so that the matrix separates easily from the colored fiber in a way that does not sacrifice robustness. The mechanical properties of the colored secondary coating are balanced with those of the primary coating so that, in heat stripping, the coating/matrix composite separates cleanly from the glass fibers.

Employing Draka Comteq's bend-resistant, single-mode glass fiber available under the trade name BendBright$^{XS}$® (or the trade name BendBright-Elite™) with the present dual-coating system, which includes a low-modulus primary coating, has been found to reduce microbending sensitivity by between about one to two orders of magnitude relative to standard single-mode fiber (SSMF) at the key transmission frequencies of 1550 nanometers and 1625 nanometers. As noted, such optical fiber not only provides outstanding resistance to microbending and macrobending, but also complies with the ITU-T G.657.A/B and ITU-T G.652.D requirements.

In particular, Draka Comteq's bend-resistant, single-mode glass fiber available under the trade name BendBright$^{XS}$® (e.g., enhanced with Draka Comteq's ColorLock$^{XS}$ brand coating system) provides resistance to macrobending required for sustained bends having a radius as low as five (5) millimeters with an estimated failure probability of less than two (2) breaks per million full-circle bends (i.e., 360° over 30 years in a properly protected environment. These bend-resistant optical fibers facilitate the rapid deployment of small, flexible cables for the delivery of fiber to the premises/business/home (i.e., FTTx) by virtue of the optical fiber's ability to sustain a loss-free transmission through small-radius bends. Cables employing such bend-resistant optical fibers may be routed around sharp bends, stapled to building frame, coiled, and otherwise employed in demanding environments while retaining clear and strong signal transmission.

In another aspect, the bend-insensitive optical fibers according to the present invention facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the optical fiber according to the present invention, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns) and the secondary coating typically has an outer diameter of between about 235 microns and about 265 microns (i.e., a secondary coating thickness of between about 20 microns and 45 microns). Optionally, the optical fiber according to the present invention may include an outermost ink layer, which is typically between two and ten microns in thickness.

In one alternative embodiment, an optical fiber according to the present invention may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

In such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns). Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns).

One exemplary optical-fiber embodiment employs a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced-thickness secondary coating of between 15 microns and 25 microns).

In accordance with the foregoing, a particular reduced-diameter, optical-fiber embodiment having exceptionally low losses employs Draka Comteq's 125-micron single-mode glass fiber available under the trade name BendBright$^{XS}$® with a 155-micron-diameter, low-modulus primary coating layer (e.g., Draka Comteq's ColorLock$^{XS}$ brand coating system) and a secondary coating (e.g., a nominal 200-micron-diameter secondary coating). As noted, BendBright$^{XS}$® bend-insensitive optical fiber complies with the ITU-T G.657.A/B and ITU-T G.652.D requirements. In this optical-fiber embodiment, the maximum tolerance with respect to the primary-coating thickness is +/−5 microns (i.e., a primary-coating outer diameter of between 150 microns and 160 microns), more typically about +/−2.5 microns (i.e., a primary-coating outer diameter of between about 152.5 microns and 157.5 microns).

Another particular reduced-diameter, optical-fiber embodiment having exceptionally low losses employs Draka Comteq's 125-micron single-mode glass fiber available under the trade name BendBright-Elite™ with a 155-micron-diameter, low-modulus primary coating layer (e.g., Draka Comteq's ColorLock$^{XS}$ brand coating system) and a secondary coating (e.g., a nominal 200-micron-diameter secondary coating). Like BendBright$^{XS}$® bend-insensitive optical fiber, BendBright-Elite™ bend-insensitive optical fiber complies with the ITU-T G.657.A/B and ITU-T G.652.D requirements. In this optical-fiber embodiment, the maximum tolerance with respect to the primary-coating thickness is +/−5 microns (i.e., a primary-coating outer diameter of between 150 microns and 160 microns), more typically about +/−2.5 microns (i.e., a primary-coating outer diameter of between about 152.5 microns and 157.5 microns).

The synergistic combination of (i) Draka Comteq's BendBright$^{XS}$® bend-insensitive single-mode glass fiber (or Draka Comteq's BendBright-Elite™ bend-insensitive glass fiber) and (ii) Draka Comteq's ColorLock$^{XS}$ brand coating system promotes significant reductions in optical-fiber diameter.

By way of example, Draka Comteq's 125-micron BendBright$^{XS}$® bend-insensitive single-mode glass fiber in combination with a 155-micron-diameter, low-modulus primary coating layer (e.g., Draka Comteq's ColorLock$^{XS}$ brand coating system) and a 200-micron-diameter secondary coating layer provides (i) comparable microbending performance to that of a 125-micron, standard single-mode glass fiber coated with a 185-micron-diameter, low-modulus primary coating layer (e.g., Draka Comteq's ColorLock$^{XS}$ brand coating system) and a 242-micron-diameter secondary coating layer and (ii) significantly better microbending performance than that of a standard single-mode optical fiber (SSMF) that employs conventional primary and secondary coatings (i.e., at an outer diameter of about 235-265 microns).

As noted previously, one suitable composition for the primary coating is a UV-curable urethane acrylate product provided by DSM Desotech (Elgin, Ill.) under the trade name DeSolite® DP 1011. It is believed that this UV-curable urethane acrylate product includes about 1.0 percent of adhesion promoter. Other suitable compositions for the primary coating include alternative UV-curable urethane acrylate products provided by DSM Desotech under various trade names, including DeSolite® DP 1014, DeSolite® DP 1014XS, and DeSolite® DP 1016. It is believed that these alternative compositions possess essentially the same low-modulus and glass-transition properties as those possessed by the aforementioned DeSolite® DP 1011 UV-curable urethane acrylate product, albeit with some compositional variation (e.g., adhesion promoter concentration increased to 1.25 percent). As will be appreciated by those having ordinary skill in the art, compositional variations may provide particular primary-coating properties that are desirable for particular applications. It appears that the DeSolite® DP 1014XS UV-curable urethane acrylate product, for instance, exhibits favorable processing characteristics and provides improved delamination resistance.

Those having ordinary skill in the art will appreciate that each of these exemplary UV-curable urethane acrylate products (i.e., DeSolite® DP 1011, DeSolite® DP 1014, DeSolite® DP 1014XS, and DeSolite® DP 1016) provides better microbending performance than do conventional primary coatings, such as other UV-curable urethane acrylate products provided by DSM Desotech under the respective trade names DeSolite® DP 1004 and DeSolite® DP 1007.

EXAMPLE 7

Comparison of Microbending Sensitivity

The respective microbend sensitivities were further measured for exemplary optical fibers, including (i) an enhanced single-mode glass fiber (ESMF) with a low-modulus coating, (ii) various bend-insensitive glass fibers (e.g., Draka Comteq's single-mode glass fibers available under the trade names BendBright$^{XS}$®) with conventional primary coatings, and (iii) various bend-insensitive glass fibers and macrobend-resistant glass fibers (e.g., Draka Comteq's single-mode glass fibers available under the trade names BendBright$^{XS}$® and BendBright®) with low-modulus primary coatings.

The testing procedure for Example 7 was an adaptation of IEC TR62221, Method B, which, as noted, is incorporated by reference in its entirety. For this modified IEC fixed-diameter sandpaper drum test, a 300-millimeter diameter quartz cylinder was wrapped with adhesive-backed, 320-grit sandpaper (i.e., approximately equivalent to 36-micron-grade sandpaper) to create a rough surface—albeit a finer surface than the surfaces employed in Examples 3-6. Then, each 440-meter fiber sample was wound in a single layer at about 1,470 mN (i.e., a controlled tension of 150 gf on the 300-millimeter diameter quartz drum using a Delachaux optical fiber winding apparatus). For the sake of convenience, this particular modification of the IEC TR62221, Method B, is herein referred to as the "Reduced-Diameter Optical-Fiber Microbend Sensitivity Test."

Two hours after winding, fiber attenuation was measured at room temperature (i.e., 23° C.) using an optical time domain reflectometer (OTDR). Then, the drum (with 440 meters of wound fiber) was temperature cycled in a temperature-controlled chamber from about room temperature through (i) −40° C. and (ii) −60° C. Fiber attenuation was measured by an optical time domain reflectometer (OTDR) after two hours of equilibration at both −40° C. and −60° C.

Absolute fiber attenuation measured at a wavelength of 1550 nanometers is provided (below) in Table 2.

TABLE 2

| (Microbend Sensitivity - 1550 nm) | | | | |
|---|---|---|---|---|
| Ex. | Optical Fiber glass fiber w/primary coating (glass fiber and coating diameters) | 23° C. (dB/km) | −40° C. (dB/km) | −60° C. (dB/km) |
| 200-micron bend-insensitive SMFs with low-modulus primary coatings | | | | |
| A | BendBright$^{XS}$ ® w/DP1014XS (125μ/155μ/199μ) | 1.114 | 1.019 | 1.002 |
| B | BendBright$^{XS}$ ® w/DP1014XS (125μ/150μ/199μ) | 1.786 | 1.612 | 1.542 |
| C | BendBright$^{XS}$ ® w/DP1016 (125μ/150μ/199μ) | 1.488 | 1.367 | 1.536 |
| 200-micron bend-insensitive SMFs with conventional primary coatings | | | | |
| D | BendBright$^{XS}$ ® w/DSM 950-076 (125μ/160μ/199μ) | 2.726 | 3.215 | 3.595 |
| E | BendBright$^{XS}$ ® w/DSM 950-076 (125μ/150μ/199μ) | 4.288 | 4.766 | 5.150 |
| 200-micron macrobend-resistant SMFs with low-modulus primary coatings | | | | |
| F | BendBright ® w/DP1014XS (125μ/150μ/199μ) | 4.683 | 4.348 | 4.878 |
| G | BendBright ® w/DP1016 (125μ/150μ/199μ) | 5.985 | 5.800 | 6.399 |
| 242-micron enhanced SMF with low-modulus primary coatings | | | | |
| H | ESMF w/DP1014 (125μ/190μ/242μ) | 0.705 | 0.663 | 0.648 |

Table 2 (above) shows that Draka Comteq's 125-micron BendBright$^{XS}$® bend-insensitive single-mode glass fiber facilitates a reduction in total optical-fiber diameter by permitting use of thinner primary and/or secondary coatings. In this regard, a 200-micron optical fiber using Draka Comteq's BendBright$^{XS}$® bend-insensitive single-mode glass fiber and relatively thin primary and secondary coatings provides microbending performance that approaches that of a 242-micron optical fiber having an enhanced standard single-mode fiber (ESMF) and thicker layers of comparable low-modulus primary and secondary coatings.

Absolute fiber attenuation measured at a wavelength of 1310 nanometers is provided (below) in Table 3:

TABLE 3

| (Microbend Sensitivity - 1310 nm) | | | | |
|---|---|---|---|---|
| Ex. | Optical Fiber glass fiber w/primary coating (glass fiber and coating diameters) | 23° C. (dB/km) | −40° C. (dB/km) | −60° C. (dB/km) |
| 200-micron bend-insensitive SMFs with low-modulus primary coatings | | | | |
| A | BendBright$^{XS}$ ® w/DP1014XS (125μ/155μ/199μ) | 0.954 | 0.869 | 0.758 |
| B | BendBright$^{XS}$ ® w/DP1014XS (125μ/150μ/199μ) | 1.574 | 1.426 | 1.478 |
| C | BendBright$^{XS}$ ® w/DP1016 (125μ/150μ/199μ) | 1.496 | 1.381 | 1.509 |
| 200-micron bend-insensitive SMFs with conventional primary coatings | | | | |
| D | BendBright$^{XS}$ ® w/DSM 950-076 (125μ/160μ/199μ) | 2.238 | 2.683 | 3.015 |
| E | BendBright$^{XS}$ ® w/DSM 950-076 (125μ/150μ/199μ) | 4.020 | 4.363 | 4.671 |

TABLE 3-continued (Microbend Sensitivity - 1310 nm)

| Ex. | Optical Fiber glass fiber w/primary coating (glass fiber and coating diameters) | 23° C. (dB/km) | −40° C. (dB/km) | −60° C. (dB/km) |
|---|---|---|---|---|
| 200-micron macrobend-resistant SMFs with low-modulus primary coatings ||||| 
| F | BendBright ® w/DP1014XS (125μ/150μ/199μ) | 2.670 | 2.447 | 2.761 |
| G | BendBright ® w/DP1016 (125μ/150μ/199μ) | 3.725 | 3.550 | 3.927 |

The comparative 200-micron optical fiber designated Example D in Tables 2 and 3 (above) employed the secondary coating used in Draka Comteq's ColorLock$^{XS}$ brand coating system, albeit with a conventional primary coating. The comparative 200-micron optical fiber designated Example E in Tables 2 and 3 (above) employed both a conventional primary coating (i.e., DSM 950-076) and a conventional secondary coating (i.e., DSM 950-044).

Tables 2 and 3 (above) indicate that, all things being equal, the low-modulus primary coatings according to the present invention (e.g., Draka Comteq's ColorLock$^{XS}$ brand coating system) provide better microbending performance than do conventional coating systems. This superior microbending performance is especially important when employing a primary-coating layer at a significantly reduced thickness on a 125-micron glass fiber in order to achieve a nominal 200-micron optical fiber.

Moreover, Tables 2 and 3 (above) indicate that, all things being equal, Draka Comteq's single-mode glass fibers available under the trade name BendBright$^{XS}$®, which employ a trench-assisted design, provide better microbending performance than do single-mode fibers that do not employ trench-assisted and/or void-assisted design (e.g., Draka Comteq's single-mode glass fibers available under the trade name BendBright®). This is somewhat unexpected—trench-assisted and other bend-insensitive glass designs are generally understood to have more pronounced effects upon macrobending rather than microbending.

EXAMPLE 8

Comparison of Microbend Sensitivity

The respective microbend sensitivities were further measured in accordance with the IEC fixed-diameter sandpaper drum test (i.e., IEC TR62221, Method B) for exemplary optical fibers, including (i) enhanced single-mode glass fibers (ESMF) with Draka Comteq's ColorLock brand coating system and (ii) Draka Comteq's single-mode glass fibers available under the trade name BendBright$^{XS}$® with Draka Comteq's improved ColorLock$^{XS}$ brand coating system.

As with Example 7 (above), the testing procedure for Example 8 was likewise an adaptation of IEC TR62221, Method B (i.e., the "Reduced-Diameter Optical-Fiber Microbend Sensitivity Test"). For this modified IEC fixed-diameter sandpaper drum test, a 300-millimeter diameter quartz cylinder was wrapped with adhesive-backed, 320-grit sandpaper (i.e., approximately equivalent to 36-micron-grade sandpaper) to create a rough surface. Then, each 440-meter fiber sample was wound in a single layer at about 1,470 mN (i.e., a controlled tension of 150 gf on the 300-millimeter diameter quartz drum using a Delachaux optical fiber winding apparatus). Two hours after winding, fiber attenuation was measured at room temperature (i.e., 23° C.) using an optical time domain reflectometer (OTDR).

Absolute fiber attenuation measured at a wavelength of 1550 nanometers is provided (below) in Table 4.

TABLE 4

(Microbend Sensitivity - 1550 nm)

| Ex. | Optical Fiber glass fiber w/primary coating (glass fiber and coating diameters) | 23° C. (dB/km) |
|---|---|---|
| nominal 200-micron bend-insensitive SMFs with low-modulus primary coatings |||
| A | BendBright$^{XS}$ ® w/DP1014XS (125μ/153μ/194μ) | 0.97 |
| B | BendBright$^{XS}$ ® w/DP1014XS (125μ/154μ/197μ) | 0.98 |
| C | BendBright$^{XS}$ ® w/DP1014XS (125μ/154μ/198μ) | 1.05 |
| D | BendBright$^{XS}$ ® w/DP1014XS (125μ/158μ/200μ) | 0.74 |
| E | BendBright$^{XS}$ ® w/DP1014XS (125μ/160μ/201μ) | 0.70 |
| 242-micron enhanced SMFs with conventional primary coatings |||
| F | ESMF w/DP1007 (125μ/190μ/242μ) | 2.004 |
| G | ESMF w/DP1007 (125μ/190μ/242μ) | 1.661 |
| H | ESMF w/DP1007 (125μ/190μ/242μ) | 1.542 |
| I | ESMF w/DP1007 (125μ/190μ/242μ) | 1.568 |
| J | ESMF w/DP1007 (125μ/190μ/242μ) | 1.973 |

Table 4 (above) shows that, Draka Comteq's 125-micron BendBright$^{XS}$® bend-insensitive single-mode glass fiber in combination with (i) a low-modulus primary coating having an outer diameter of between about 150 microns and 160 microns and (ii) a secondary coating having an outer diameter of between about 195 microns and 200 microns provides significantly better microbending performance compared with that of conventional 125-micron enhanced single-mode glass fiber (ESMF) in combination with a 190-micron-diameter, conventional primary coating and a 242-micron-diameter, conventional secondary coating.

Stated otherwise, a nominal 200-micron optical fiber formed from Draka Comteq's 125-micron BendBright$^{XS}$® bend-insensitive single-mode glass fiber and Draka Comteq's ColorLock$^{XS}$ brand coating system provides superior microbending performance to that of a 242-micron, enhanced single-mode optical fiber (ESMF) that employs conventional primary and secondary coatings.

Moreover, a nominal 200-micron optical fiber formed from Draka Comteq's 125-micron BendBright$^{XS}$® bend-insensitive single-mode glass fiber and Draka Comteq's ColorLock$^{XS}$ brand coating system provides similar microbending performance to that of a 242-micron, enhanced single-mode optical fiber (ESMF) that employs a comparable low-modulus primary coating and a comparable secondary coating. By way of example, the 200-micron optical fibers designated Examples A-E in Table 4 (above) provide comparable microbending performance to that of the 242-micron optical fiber designated Example H in Table 2 (above), which, as noted, is a 242-micron optical fiber having an enhanced standard single-mode fiber (ESMF) and thicker layers of comparable low-modulus primary and secondary coatings.

As noted, whereas single-mode glass fibers that are commercially available from Draka Comteq under the trade name BendBright® are compliant with the ITU-T G.652.D requirements, single-mode glass fibers that are commercially available from Draka Comteq under the trade names BendBright$^{XS}$® and BendBright-Elite™ are compliant with the ITU-T G.652.D requirements and the ITU-T G.657.A/B requirements. The respective ITU-T G.652 recommendations and the respective ITU-T G.657 recommendations are hereby incorporated by reference in their entirety.

In this regard, this application incorporates by reference product specifications for the following Draka Comteq single-mode optical fibers: (i) Enhanced Single Mode Fiber (ESMF); (ii) BendBright® single-mode optical fiber; (iii) BendBright$^{XS}$® single-mode optical fiber; and (iv) BendBright-Elite™ single-mode optical fiber. This technical information is provided as Appendices 1-4, respectively, in priority U.S. Provisional Application No. 61/248,319 for a Reduced-Diameter Optical Fiber (filed Oct. 2, 2009), which, as noted, is incorporated by reference in its entirety. Table 5 (below) depicts optical-fiber attributes of an exemplary bend-insensitive optical fiber in accordance with the present invention.

TABLE 5

(Exemplary Optical-Fiber Attributes)

| Attribute | Detail | Value | | |
|---|---|---|---|---|
| Mode Field Diameter | Wavelength (nm) | 1310 | | |
| | Range of Nominal Values (μm) | 8.5-9.3 | | |
| Cladding Diameter | Nominal (μm) | 125 | | |
| | Tolerance (μm) | ±0.7 | | |
| Core Concentricity Error | Maximum (μm) | 0.5 | | |
| Cladding Non-Circularity | Maximum (%) | 0.7 | | |
| Cable Cut-Off Wavelength | Maximum (nm) | 1260 | | |
| Macrobending Loss | Radius (mm) | 15 | 10 | 7.5 |
| | Number of Turns | 10 | 1 | 1 |
| | Maximum @ 1550 nm (dB) | 0.03 | 0.1 | 0.5 |
| | Maximum @ 1625 nm (dB) | 0.1 | 0.2 | 1.0 |
| Proof Stress | Minimum (GPa) | 0.7 | | |
| Chromatic Dispersion Coefficient | $\lambda_{0min}$ (nm) | 1300 | | |
| | $\lambda_{0max}$ (nm) | 1324 | | |
| | $S_{0max}$ (ps/(nm$^2$·km)) | ≦0.092 | | |

It is within the scope of the present invention to achieve reduced-diameter optical fibers by employing other kinds of trench-assisted, bend-insensitive glass fibers. In this regard, U.S. Patent Application Publication No. US 2008/0056654 A1 for a for a Low Bend Loss Single-Mode Optical Fiber (Bickham et al.), which is hereby incorporated by reference in its entirety, discloses a glass fiber that includes a cladding region with a depressed refractive index.

Furthermore, it is within the scope of the present invention to achieve reduced-diameter optical fibers by employing bend-insensitive glass fibers that include regular or random holes, whether continuous or discrete, in an annular region (e.g., an inner cladding). In this regard, U.S. Pat. No. 7,444,838 for a Holey Optical Fiber with Random Pattern of Holes and Method for Making the Same (Pickrell et al.) and U.S. Pat. No. 7,567,742 for a Holey Optical Fiber with Random Pattern of Holes and Method for Making Same (Pickrell et al.), each of which is hereby incorporated by reference in its entirety, disclose a glass fiber that includes a holey region (e.g., a cladding) with a random array of holes. Similarly, U.S. Pat. No. 7,450,806 for Microstructured Optical Fibers and Methods (Bookbinder et al.), which is hereby incorporated by reference in its entirety, discloses a microstructured glass fiber that includes voids within the cladding region.

Other trench-assisted and/or void-assisted optical fibers are disclosed in the following patents and patent application publications, each of which is hereby incorporated by reference in its entirety: U.S. Pat. No. 4,852,968 for an Optical Fiber Comprising a Refractive Index Trench (Reed); U.S. Pat. No. 5,044,724 for a Method of Producing Optical Fiber, and Fiber Produced by the Method (Glodis et al.); U.S. Pat. No. 6,901,197 for a Microstructured Optical Fiber (Hasegawa et al.); U.S. Pat. No. 7,095,940 for an Optical Fiber, Method for Manufacturing Same and Optical Transmission Channel (Hayami et al.); U.S. Pat. No. 7,228,040 for a Hole-Assisted Single Mode Optical Fiber (Nakajima et al.); U.S. Pat. No. 7,239,784 for an Optical Fiber, Method for Manufacturing Same and Optical Transmission Channel (Hayami et al.); U.S. Pat. No. 7,292,762 for a Hole-Assisted Holey Fiber and Low Bending Loss Multimode Holey Fiber (Guan et al.); U.S. Pat. No. 7,433,566 for a Low Bend Loss Optical Fiber with High Modulus Coating (Bookbinder et al.); U.S. Pat. No. 7,526,166 for a High Numerical Aperture Fiber (Bookbinder et al.); U.S. Pat. No. 7,526,169 for a Low Bend Loss Quasi-Single-Mode Optical Fiber and Optical Fiber Line (Bickham et al.); U.S. Pat. No. 7,555,187 for a Large Effective Area Fiber (Bickham et al.); U.S. Pat. No. 7,450,807 for a Low Bend Loss Optical Fiber with Deep Depressed Ring (Bickham et al.); U.S. Pat. No. 7,574,088 for an Optical Fiber and Optical Fiber Ribbon, and Optical Interconnection System (Sugizaki et al.); U.S. Patent Application Publication No. US 2008/0166094 A1 for a Bend Resistant Multimode Optical Fiber (Bickham et al.); U.S. Patent Application Publication No. US 2008/0304800 A1 for an Optical Fiber with Large Effective Area (Bickham et al.); U.S. Patent Application Publication No. US 2009/0060437 A1 for Bend Insensitivity in Single Mode Optical Fibers (Fini et al.); U.S. Patent Application Publication No. US 2009/0126407 A1 for Methods for Making Optical Fiber Preforms and Microstructured Optical Fibers (Bookbinder et al.); U.S. Patent Application Publication No. US 2009/0154888 A1 for a Bend Resistant Multimode Optical Fiber (Steele et al.); U.S. Patent Application Publication No. US 2009/0169163 A1 for a Bend Resistant Multimode Optical Fiber (Steele et al.); and International Patent Application Publication No. WO 2009/064381 A1 for Methods for Making Optical Fiber Preforms and Microstructured Optical Fibers (Bookbinder et al.).

It is believed that the foregoing glass fibers, as well as other glass fibers disclosed in previously incorporated-by-reference patent documents, might be combined with the low-modulus primary coatings as herein disclosed to achieve satisfactory, reduced-diameter optical fibers. As such, the resulting reduced-diameter optical fibers (e.g., holey fibers with low-modulus primary coatings) are within the scope of the present invention.

That said, it has been preliminarily observed that, with respect to reduced-diameter optical fibers having low-modulus primary coatings, bend-insensitive glass fibers having full-solid designs (e.g., 125-micron BendBright$^{XS}$® bend-insensitive single-mode glass fiber) seem to provide better microbending performance than do bend-insensitive glass fibers having hole-assisted designs.

Furthermore, it has been preliminarily observed that, with respect to reduced-diameter optical fibers, bend-insensitive glass fibers having full-solid designs (e.g., 125-micron BendBright$^{XS}$® bend-insensitive single-mode glass fiber) also seem to provide better mechanical performance than do bend-insensitive glass fibers having void-assisted designs (e.g., holey fibers). Those having ordinary skill in the art will appreciate that mechanical robustness is an important consideration when employing a bend-insensitive glass fiber within a nominal 200-micron optical fiber.

In this regard, 200-micron optical fibers that are formed from (i) Draka Comteq's 125-micron BendBright$^{XS}$® bend-insensitive single-mode glass fiber, which has a full-solid glass design, and (ii) Draka Comteq's ColorLock$^{XS}$ brand coating system demonstrate comparable mechanical reliability to that of a standard 242-micron optical fiber (e.g., a SSMF).

The 200-micron optical fibers that are formed from Draka Comteq's 125-micron BendBright$^{XS}$® bend-insensitive single-mode glass fiber and Draka Comteq's ColorLock$^{XS}$ brand coating system were tested for tensile strength and dynamic fatigue in accordance with the FOTP-28 standard, which is hereby incorporated by reference in its entirety. Representative mechanical reliability for these 200-micron optical fibers, which possessed differently colored secondary coatings, is provided (below) in Table 6.

TABLE 6

(Mechanical Reliability)

| ColorLock$^{XS}$ color | Tensile Strength 50% failure (kpsi) | Tensile Strength 15% failure (kpsi) | Dynamic Fatigue (n-value) |
| --- | --- | --- | --- |
| Blue | 711 | 539 | 22.5 |
| Orange | 712 | 626 | 22.0 |
| Green | 705 | 600 | 20.4 |
| Brown | 675 | 557 | 20.8 |
| Slate | 721 | 623 | 22.8 |
| White | 729 | 577 | 21.8 |
| Red | 708 | 577 | 20.9 |
| Black | 709 | 627 | 22.8 |
| Yellow | 715 | 540 | 21.4 |
| Violet | 713 | 580 | 21.6 |
| Rose | 723 | 557 | 21.9 |
| Aqua | 730 | 580 | 23.0 |

As will be understood by those having ordinary skill in the art, industry minimum requirements for tensile strength at fiber failure are 550 kpsi at the 50$^{th}$ percentile of the optical-fiber tensile-strength distribution (i.e., the median tensile strength) and 455 kpsi at the 15$^{th}$ percentile of the optical-fiber tensile-strength distribution.

The industry minimum requirement for the dynamic fatigue stress corrosion factor (n-value) is 18. In this regard, dynamic fatigue stress corrosion factor provides an indication of how fast a flaw in the glass fiber's silica structure propagates under strain.

As will be further understood by those having ordinary skill in the art, for both tensile strength and dynamic fatigue stress corrosion factor, an adequate sampling of optical fibers (e.g., n=30) provides a statistical estimate that facilitates characterization the optical-fiber population.

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers.

As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

It seems that reducing the diameter of the component glass fiber might make the resulting optical fiber more susceptible to microbending attenuation. For example, as compared with a component glass fiber having a standard diameter of 125 microns, a component glass fiber having a diameter of 110 microns might be twice as susceptible to microbending losses. That said, the advantages of further reducing optical-fiber diameter may be worthwhile for some optical-fiber applications.

In view of the foregoing, commonly assigned U.S. Patent Application No. 61/177,996 for a Reduced-Diameter Optical Fiber, filed May 13, 2009, (Overton) and U.S. Patent Application No. 61/248,319 for a Reduced-Diameter Optical Fiber, filed Oct. 2, 2009, (Overton) are hereby incorporated by reference in their entirety.

As noted, the optical fiber according to the present invention may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

As discussed previously, combining (i) a coating system according to the present invention with (ii) a glass fiber having a refractive index profile that itself provides bend resistance (e.g., low macrobending sensitivity) has been found to provide unexpectedly superior reductions in microbend sensitivity. Indeed, bend-insensitive glass fibers are especially suitable for use with the coating system of the present invention (e.g., Draka Comteq's ColorLock$^{XS}$ brand coating system).

Accordingly, the optical fiber (e.g., bend-insensitive optical fiber) as herein disclosed may be included in novel drop-cable structures.

Within a fiber optic network, drop cables, which often span short distances, are often used to provide an end connection to a network subscriber. Drop cables, which typically terminate at a home or business, are critical components of fiber optic deployments, such as fiber-to-the-home (FTTH).

It is desirable for drop cables to be small and flexible while also being sufficiently robust to provide a reliable connection to end users (e.g., network subscribers). Drop cables may include a single-fiber or multi-fiber loose buffer tube enclosed by a flat sheath. Such sheaths typically contain one or more strength elements (e.g., two parallel strength elements positioned on opposite sides of the buffer tube). In other designs, the sheath does not enclose a loose buffer tube but rather has a cavity that loosely contains a single optical fiber. Conventional flat drop cables typically have a width of at least about eight millimeters and a height of at least about four millimeters.

The dimensions of the space inside of the loose buffer tube or, alternatively, the cavity within the flat sheath, and of all of the surrounding cable components are typically selected so as to resist undue mechanical forces upon the optical fiber during drop-cable installation and use.

The boundaries of drop cable design have been limited by how much stress (e.g., tensile stress) can be applied to an optical fiber (both short term and long term) and by how much attenuation the optical fiber experiences as a result of microbending and macrobending during drop-cable expansion and contraction (e.g., thermal contraction and/or post-extrusion shrinkage). In other words, the density of optical fibers within drop cables has been limited by such constraints. On the other hand, it is desirable to design drop cables with high optical fiber density to reduce cable diameter and cost.

Though existing drop cables provide adequate performance, the bend-insensitive optical fibers as disclosed previously make improved drop-cable structures possible.

Figure 13:
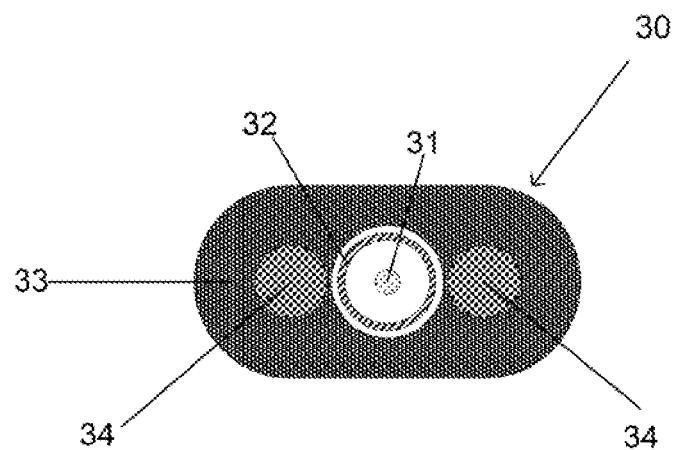
FIG. 13 schematically depicts a cross-sectional view of a conventional drop cable.

FIG. 13 depicts a schematic cross-section of a conventional drop cable 30, which shows a width-to-height ratio of about 2:1. This conventional design requires a relatively large buffer tube 32 (e.g., having a diameter of about 1.9 to 3.0 millimeters), which loosely surrounds one or more optical fibers 31.

The present drop cable excludes a buffer tube (FIG. 14) or employs a tightly buffered bend-insensitive fiber (FIG. 15), such as a tightly buffered optical fiber having an outer diameter of about 900 microns. In this regard, as compared with conventional drop cables, the present drop cables achieve height reductions of at least about one millimeter (e.g., about 1.5 millimeters of more) and width reductions of at least about two millimeters (e.g., 2.5-3.5 millimeters or more).

Figure 14:
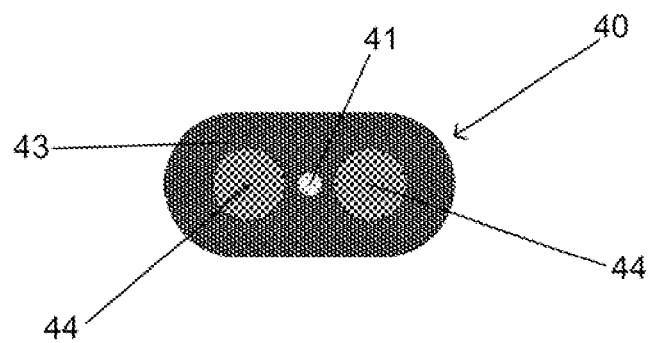
FIG. 14 schematically depicts a cross-sectional view of an exemplary drop cable employing bend-insensitive optical fiber according to the present invention.

By way of example, FIG. 14 depicts a schematic cross-section of an exemplary flat drop cable 40 that does not require a buffer tube. Instead, one or more bend-insensitive fibers 41 are positioned directly within a small, longitudinal cavity formed within a sheath 43. As depicted in FIG. 14, the sheath 43 may tightly encase the optical fiber 41. This elimination of a conventional buffer tube facilitates cable size reduction.

Figure 15:
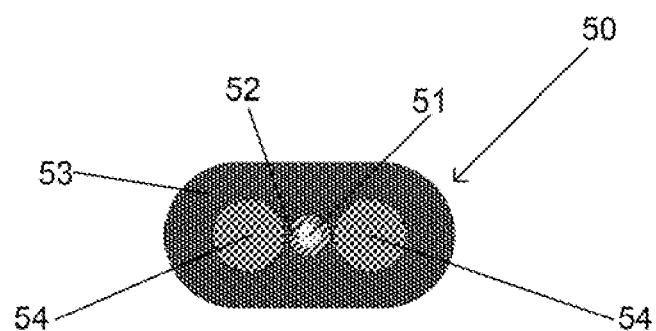
FIG. 15 schematically depicts a cross-sectional view of an alternative, exemplary drop cable employing a tightly buffered optical fiber according to the present invention.

In this regard, the exemplary drop cables in accordance with the present invention (e.g., as depicted in FIGS. 14 and 15) may have a height of between about 2.5 millimeters and 3.0 millimeters and a width of between about 4.5 millimeters and 6.0 millimeters. The drop cable 40 typically has a single bend-insensitive optical fiber 41, though more than one optical fiber 41 may be positioned directly within a cavity formed in the sheath 43.

As noted previously, the bend-insensitive optical fiber 41 typically has a diameter of about 250 microns (e.g., between about 235 microns and 265 microns), though reduced-diameter, bend-insensitive optical fibers may be employed instead (e.g., optical fibers having a diameter of between about 150 and 230 microns, such as about 200 microns).

The sheath 43 may be a single jacket formed from a dielectric material, such as polyethylene, polypropylene, polyvinyl chloride (PVC), polyamides (e.g., nylon), polyester (e.g., PBT), fluorinated plastics (e.g., perfluoroethylene propylene, polyvinyl fluoride, or polyvinylidene difluoride), and/or ethylene vinyl acetate. The sheath materials may also contain other additives, such as nucleating agents, flame-retardants, smoke-retardants, antioxidants, UV absorbers, and/or plasticizers.

As depicted in FIG. 14, the drop cable 40 may contain one or more strength members 44—two strength members 44 are depicted in FIG. 14. The strength members 44 may be formed, for example, from a nonmetallic material (e.g., glass reinforced plastic (GRP)). Alternatively, the strength members 44 may be formed from a metal (e.g., steel). It is possible to reduce the size of the strength members 44 to further reduce the relative dimensions of the drop cable 40.

FIG. 15 depicts a schematic cross-section of an alternative, exemplary flat drop cable 50. As noted, the drop cable 50 employs a tight-buffered optical fiber (i.e., a buffer tube 52 closely enclosing an optical fiber 51). As in FIG. 14, the drop cable 50 depicted in FIG. 15 may have one or more bend-insensitive optical fibers 51, though the buffer tube 52 typically encloses a single bend-insensitive optical fiber 52.

The outer diameter of the buffer tube 52 is typically less than about 1,000 microns (e.g., between about 500 microns and 900 microns). This is significantly smaller than the conventional buffer-tube structure depicted in FIG. 13.

The tightly buffer tube 52 may be formed from polyolefins (e.g., polyethylene, polypropylene, or blends thereof), including fluorinated polyolefins, polyesters (e.g., polybutylene terephthalate), polyamides (e.g., nylon), as well as other polymeric materials and polymeric blends, such as elastomer, and may or may not be foamed. The buffer materials may also contain other additives, such as nucleating agents, flame-retardants, smoke-retardants, antioxidants, UV absorbers, and/or plasticizers.

A sheath 53, having similar dimensions to the sheath 43 depicted in FIG. 14, may tightly encase the buffer tube 52. Also as shown in FIG. 14, the drop cable 50 depicted in FIG. 15 may include one or more strength members 54.

The present flat drop cables may further include a lubricant, an internal and/or external toning portion, water blocking components, strength yarns, and/or ripcords. One or more of the flat surfaces of the present flat drop cables may be concave, which facilitates feeding such flat drop cables into ducts and accessing the optical fibers contained in such flat drop cables.

The present flat drop cables may be used in any cable deployment where drop cable use is desired, including aerial applications. In this regard, the present drop cables typically meet or exceed Telcordia Technologies requirements for optical-fiber drop cables as set forth in GR-20-CORE, Section 6.9.2 (Issue 3, May 2008). The GR-20-CORE generic requirements (Issue 3, May 2008) are hereby incorporated by reference in their entirety. Moreover, the present drop cables typically satisfy other standard specifications, such as the ICEA S-110-717-2003 standard and the standards for drop cables set forth in Bulletin 1753F-601 (PE-90) from the United States Department of Agriculture (USDA) Rural Electrification Administration. These ICEA and USDA standards are hereby incorporated by reference in their entirety.

The use of bend-insensitive optical fibers in such flat drop cables facilitates smaller cable dimensions. In this regard, reduced-size cables are particularly advantageous for aerial applications, because a reduction in cable dimensions may reduce the loading of wind and ice, which, in turn, may permit the use of smaller cable strength members. In this regard, the present drop cables typically satisfy applicable standards as set forth in the National Electric Safety Code (NESC). As will be understood by those having ordinary skill in the art, smaller cable dimensions reduce the materials needed to produce the drop cable, which may correspondingly lower the production costs.

This application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Patent Application Publication No. US 2008/0037942 A1 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Patent Application Publication No. US2009/0003781 A1 for an Optical Fiber Cable Having a Deformable Coupling Element (Parris et al.); U.S. Patent Application Publication No. US2009/0003779 A1 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. patent application Ser. No. 12/557,055 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Lovie et al.); U.S. patent application Ser. No. 12/558,390 for a Buffer Tubes for Mid-Span Storage, filed Sep. 11, 2009, (Barker); U.S. patent application Ser. No. 12/614,692 for Single-Fiber Drop Cables for MDU Deployments, filed on or about Nov. 9, 2009, (Overton); U.S. patent application Ser. No. 12/614,754 for Optical-Fiber Loose Tube Cables, filed on Nov. 9, 2009, (Overton); U.S. patent application Ser. No. 12/615,106 for ADSS Cables with High-Performance Optical Fiber, filed on or about Nov. 9, 2009, (Overton); U.S. patent application Ser. No. 12/615,698 for Reduced-Diameter Ribbon Cables with High-Performance Optical Fiber, filed on or about Nov. 9, 2009, (Overton); U.S. patent application Ser. No. 12/615,737 for a Reduced-Diameter, Easy-Access Loose Tube Cable, filed on or about Nov. 9, 2009, (Overton); U.S. Patent Application No. 61/112,845 for Single-Fiber Drop Cables for MDU Deployments, filed Nov. 10, 2008, (Overton); U.S. Patent Application No. 61/112,863 for Bend-Insensitive-Fiber Loose Tube Cables, filed Nov. 10, 2008, (Overton); U.S. Patent Application No. 61/112,912 for a Reduced-Size Flat Drop Cable with Bend-Insensitive Fiber, filed Nov. 10, 2008, (Overton); U.S. Patent Application No. 61/112,926 for ADSS Cables with Bend-Insensitive Fiber, filed Nov. 10, 2008, (Overton); U.S. Patent Application No. 61/112,965 for Reduced-Diameter Ribbon Cables with High-Performance Optical Fiber, filed Nov. 10, 2008, (Overton); U.S. Patent Application No. 61/113,067 for a Reduced-Diameter, Easy-Access Loose Tube Cable, filed Nov. 10, 2008, (Overton).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:
1. A reduced-size drop cable, comprising:
  a cable jacket, said cable jacket defining a longitudinal cavity; and
  a bend-insensitive optical fiber positioned within the longitudinal cavity;
  wherein said bend-insensitive optical fiber comprises a glass fiber and a primary coating surrounding said glass fiber, said primary coating possessing (i) an in situ modulus of less than 0.50 MPa and (ii) a glass transition temperature of less than −55° C.;

wherein the bend-insensitive optical fiber has:
- at a wavelength of 1310 nanometers, a mode field diameter with nominal values of between 8.5 microns and 9.3 microns;
- a cable cutoff wavelength of no more than 1260 nanometers;
- a zero chromatic dispersion wavelength of at least 1300 nanometers and no more than 1324 nanometers;
- at the zero chromatic dispersion wavelength, a slope of no more than 0.092 ps/(nm$^2$·km);
- at a wavelength of 1550 nanometers, induced bending attenuation of (i) 0.03 dB or less for ten turns around a mandrel radius of 15 millimeters, (ii) 0.1 dB or less for one turn around a mandrel radius of 10 millimeters, and (iii) 0.5 dB or less for one turn around a mandrel radius of 7.5 millimeters; and
- at a wavelength of 1625 nanometers, induced bending attenuation of (i) 0.1 dB or less for ten turns around a mandrel radius of 15 millimeters, (ii) 0.2 dB or less for one turn around a mandrel radius of 10 millimeters, and (iii) 1.0 dB or less for one turn around a mandrel radius of 7.5 millimeters.

2. A reduced-size drop cable according to claim 1, comprising two strength members enclosed within said cable jacket, wherein the longitudinal cavity is centrally positioned within said cable jacket and wherein said strength members are positioned opposite one another relative to the longitudinal cavity.

3. A reduced-size drop cable according to claim 1, comprising a buffer tube positioned within the longitudinal cavity and enclosing said bend-insensitive optical fiber.

4. A reduced-size drop cable according to claim 3, wherein said buffer tube tightly surrounds exactly one said bend-insensitive optical fiber.

5. A reduced-size drop cable according to claim 3, wherein the outer diameter of said buffer tube is approximately equal to the diameter of the longitudinal cavity.

6. A reduced-size drop cable according to claim 1, wherein said primary coating possesses an in situ modulus of greater than about 0.2 MPa.

7. A reduced-size drop cable according to claim 1, wherein said primary coating possesses an in situ modulus of between about 0.3 MPa and 0.4 MPa.

8. A reduced-size drop cable according to claim 1, wherein said primary coating possesses a glass transition temperature of less than about −60° C.

9. A reduced-size drop cable, comprising:
- a bend-insensitive optical fiber, said bend-insensitive optical fiber comprising a glass fiber and a primary coating surrounding said glass fiber, said primary coating possessing (i) an in situ modulus of less than about 0.65 MPa and (ii) a glass transition temperature of less than about −50° C.;
- a cable jacket tightly surrounding said bend-insensitive optical fiber, wherein said bend-insensitive optical fiber is centrally positioned within said cable jacket; and
- two strength members enclosed within said cable jacket, wherein said strength members are positioned opposite one another relative to said bend-insensitive optical fiber.

10. A reduced-size drop cable, comprising:
- a bend-insensitive optical fiber, said bend-insensitive optical fiber comprising a glass fiber and a primary coating surrounding said glass fiber, said primary coating possessing (i) an in situ modulus of less than about 0.65 MPa and (ii) a glass transition temperature of less than about −50° C.;
- a buffer tube tightly surrounding said bend-insensitive optical fiber;
- a cable jacket tightly surrounding said buffer tube;
wherein said buffer tube is centrally positioned within said cable jacket; and
- two strength members enclosed within said cable jacket, wherein said strength members are positioned opposite one another relative to said buffer tube.

11. A reduced-size drop cable according to claim 10, wherein said primary coating possesses (i) an in situ modulus of less than 0.50 MPa and (ii) a glass transition temperature of less than −55° C.

12. A reduced-size drop cable according to claim 1, wherein said cable jacket tightly surrounds exactly one said bend-insensitive optical fiber.

13. A reduced-size drop cable according to claim 9, wherein said primary coating possesses (i) an in situ modulus of less than 0.50 MPa and (ii) a glass transition temperature of less than −55° C.

14. A reduced-size drop cable according to claim 10, wherein said bend-insensitive optical fiber:
- at a wavelength of 1310 nanometers, has a nominal mode field diameter of between 8.5 microns and 9.3 microns;
- has a standard cable cutoff wavelength of 1260 nanometers or less;
- has a zero chromatic dispersion wavelength of between 1300 nanometers and 1324 nanometers;
- at the zero chromatic dispersion wavelength, has a slope of 0.092 ps/(nm$^2$·km) or less;
- at a wavelength of 1550 nanometers, has induced bending attenuation of (i) 0.03 dB or less for ten turns around a mandrel radius of 15 millimeters, (ii) 0.1 dB or less for one turn around a mandrel radius of 10 millimeters, and (iii) 0.5 dB or less for one turn around a mandrel radius of 7.5 millimeters; and
- at a wavelength of 1625 nanometers, has induced bending attenuation of (i) 0.1 dB or less for ten turns around a mandrel radius of 15 millimeters, (ii) 0.2 dB or less for one turn around a mandrel radius of 10 millimeters, and (iii) 1.0 dB or less for one turn around a mandrel radius of 7.5 millimeters.

15. A reduced-size drop cable according to claim 14, wherein, at wavelengths of 1550 nanometers and 1625 nanometers, said bend-insensitive optical fiber possesses a spectral-attenuation added loss of less than about 0.1 dB/km as measured in accordance with IEC TR62221, Method B (fixed diameter drum).

16. A reduced-size drop cable according to claim 14, wherein, at a wavelength of 1550 nanometers, said bend-insensitive optical fiber possesses microbending sensitivity of (i) less than 75 (dB/km)/(N/mm) at 23° C., (ii) less than 100 (dB/km)/(N/mm) at −40° C., and (iii) less than 200 (dB/km)/(N/mm) at −60° C. as measured in accordance with a modified IEC TR62221 fixed-diameter sandpaper drum test in which a 440-meter fiber sample is wound in a single layer at about 1,470 mN on a 300-millimeter diameter quartz drum that is wrapped with 180-grit sandpaper to create a rough surface.

17. A reduced-size drop cable according to claim 10, wherein, at a wavelength of 1550 nanometers, said bend-insensitive optical fiber possesses a spectral-attenuaton added loss of less than 0.2 dB/km as measured at −60° C. in accordance with a modified IEC TR62221, Method D (basketweave) test in which a fiber sample is wound in fifty layers at about 490 mN on a 300-millimeter diameter quartz drum with a 9-millimeter lay.

18. A reduced-size drop cable according to claim 10, wherein said bend-insensitive optical fiber:
- comprises a glass fiber having an outer diameter of about 125 microns and a primary coating surrounding said glass fiber, said primary coating possessing (i) an in situ modulus of less than 0.50 MPa and (ii) a glass transition temperature of less than −55° C.;
- has an outer diameter of between about 235 microns and 265 microns; and
- at a wavelength of 1550 nanometers, possesses a spectral-attenuation added loss of less than 0.7 dB/km as measured at −60° C. in accordance with a modified IEC TR62221 fixed-diameter sandpaper drum test in which a 400-meter fiber sample is wound in a single layer at about 1,470 mN on a 300-millimeter diameter quartz drum that is wrapped with 220-grit sandpaper to create a rough surface.

19. A reduced-size drop cable according to claim 9, wherein said bend-insensitive optical fiber has:
- at a wavelength of 1310 nanometers, a nominal mode field diameter of between 8.5 microns and 9.3 microns;
- a standard cable cutoff wavelength of 1260 nanometers or less;
- a zero chromatic dispersion wavelength of between 1300 nanometers and 1324 nanometers;
- at the zero chromatic dispersion wavelength, a slope of 0.092 ps/(nm²·km) or less;
- at a wavelength of 1550 nanometers, induced bending attenuation of (i) 0.03 dB or less for ten turns around a mandrel radius of 15 millimeters, (ii) 0.1 dB or less for one turn around a mandrel radius of 10 millimeters, and (iii) 0.5 dB or less for one turn around a mandrel radius of 7.5 millimeters; and
- at a wavelength of 1625 nanometers, induced bending attenuation of (i) 0.1 dB or less for ten turns around a mandrel radius of 15 millimeters, (ii) 0.2 dB or less for one turn around a mandrel radius of 10 millimeters, and (iii) 1.0 dB or less for one turn around a mandrel radius of 7.5 millimeters.

20. A reduced-size drop cable according to claim 19, wherein, at wavelengths of 1550 nanometers and 1625 nanometers, said bend-insensitive optical fiber possesses a spectral-attenuation added loss of less than about 0.1 dB/km as measured in accordance with IEC TR62221, Method B (fixed diameter drum).

21. A reduced-size drop cable according to claim 19, wherein, at a wavelength of 1550 nanometers, said bend-insensitive optical fiber possesses microbending sensitivity of (i) less than 75 (dB/km)/(N/mm) at 23° C., (ii) less than 100 (dB/km)/(N/mm) at −40° C., and (iii) less than 200 (dB/km)/(N/mm) at −60° C. as measured in accordance with a modified IEC TR62221 fixed-diameter sandpaper drum test in which a 440-meter fiber sample is wound in a single layer at about 1,470 mN on a 300-millimeter diameter quartz drum that is wrapped with 180-grit sandpaper to create a rough surface.

22. A reduced-size drop cable according to claim 9, wherein, at a wavelength of 1550 nanometers, said bend-insensitive optical fiber possesses a spectral-attenuaton added loss of less than 0.2 dB/km as measured at −60° C. in accordance with a modified IEC TR62221, Method D (basketweave) test in which a fiber sample is wound in fifty layers at about 490 mN on a 300-millimeter diameter quartz drum with a 9-millimeter lay.

23. A reduced-size drop cable according to claim 9, wherein said bend-insensitive optical fiber:
- comprises a glass fiber having an outer diameter of about 125 microns and a primary coating surrounding said glass fiber, said primary coating possessing (i) an in situ modulus of less than 0.50 MPa and (ii) a glass transition temperature of less than −55° C.;
- has an outer diameter of between about 235 microns and 265 microns; and
- at a wavelength of 1550 nanometers, possesses a spectral-attenuation added loss of less than 0.7 dB/km as measured at −60° C. in accordance with a modified IEC TR62221 fixed-diameter sandpaper drum test in which a 400-meter fiber sample is wound in a single layer at about 1,470 mN on a 300-millimeter diameter quartz drum that is wrapped with 220-grit sandpaper to create a rough surface.

24. A reduced-size drop cable according to claim 9, wherein the reduced-size drop cable has a width-to-height ratio of about 2:1.

25. A reduced-size drop cable according to claim 9, wherein said bend-insensitive optical fiber has an outer diameter of between 150 microns and 230 microns.

26. A reduced-size drop cable according to claim 9, wherein said bend-insensitive optical fiber is a multimode optical fiber.

27. A reduced-size drop cable according to claim 9, wherein said primary coating possesses (i) an in situ modulus of between 0.2 and 0.50 MPa and (ii) a glass transition temperature of less than −55° C.

28. A reduced-size drop cable according to claim 9, wherein said primary coating possesses (i) an in situ modulus of between about 0.3 MPa and 0.4 MPa and (ii) a glass transition temperature of less than −55° C.

29. A reduced-size drop cable according to claim 9, wherein said primary coating possesses (i) an in situ modulus of less than 0.50 MPa and (ii) a glass transition temperature of less than about −60° C.

30. A reduced-size drop cable according to claim 10, wherein the reduced-size drop cable has a width-to-height ratio of about 2:1.

31. A reduced-size drop cable according to claim 10, wherein said bend-insensitive optical fiber has an outer diameter of between 150 microns and 230 microns.

32. A reduced-size drop cable according to claim 10, wherein said bend-insensitive optical fiber is a multimode optical fiber.

33. A reduced-size drop cable according to claim 10, wherein said primary coating possesses (i) an in situ modulus of between 0.2 and 0.50 MPa and (ii) a glass transition temperature of less than −55° C.

34. A reduced-size drop cable according to claim 10, wherein said primary coating possesses (i) an in situ modulus of between about 0.3 MPa and 0.4 MPa and (ii) a glass transition temperature of less than −55° C.

35. A reduced-size drop cable according to claim 30, wherein said primary coating possesses (i) an in situ modulus of less than 0.50 MPa and (ii) a glass transition temperature of less than about −60° C.

* * * * *